(12) United States Patent
Maruyoshi et al.

(10) Patent No.: US 7,961,596 B2
(45) Date of Patent: Jun. 14, 2011

(54) RING-SHAPED REDUNDANT COMMUNICATION PATH CONTROL METHOD

(75) Inventors: Masahiro Maruyoshi, Chiba-ken (JP); Muneyoshi Suzuki, Chiba-ken (JP); Kunio Hato, Chiba-ken (JP); Katsuya Minami, Chiba-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 105 days.

(21) Appl. No.: 12/281,773

(22) PCT Filed: Mar. 27, 2007

(86) PCT No.: PCT/JP2007/056480
§ 371 (c)(1),
(2), (4) Date: Sep. 5, 2008

(87) PCT Pub. No.: WO2007/119534
PCT Pub. Date: Oct. 25, 2007

(65) Prior Publication Data
US 2009/0073874 A1    Mar. 19, 2009

(30) Foreign Application Priority Data

Mar. 28, 2006 (JP) ............................... 2006-088273

(51) Int. Cl.
*H04J 3/14* (2006.01)
(52) U.S. Cl. ......... 370/217; 370/222; 370/223; 370/225
(58) Field of Classification Search .................. 370/222, 370/223, 217, 225
See application file for complete search history.

(56) References Cited

U.S. PATENT DOCUMENTS

| | | | |
|---|---|---|---|
| 6,532,088 B1* | 3/2003 | Dantu et al. | 370/223 |
| 6,538,987 B1* | 3/2003 | Cedrone et al. | 370/216 |
| 6,952,396 B1* | 10/2005 | Cottreau et al. | 370/222 |

(Continued)

FOREIGN PATENT DOCUMENTS

JP    8-251216    9/1996

(Continued)

OTHER PUBLICATIONS

IEEE 802.1D-1998 Edition MAC bridges (Chapter 8).

(Continued)

*Primary Examiner* — Andrew Lee
(74) *Attorney, Agent, or Firm* — Oblon, Spivak, McClelland, Maier & Neustadt, L.L.P.

(57) ABSTRACT

In a ring redundant communication path control method, each of transfer apparatuses periodically transmits an inspection frame for inspecting a communication path, detects a failure of the communication path when the inspection frame is not received for a fixed time, transmits a non-arrival notification frame for notifying that the inspection frame has not arrived yet, and detects a failure of the communication path when the non-arrival notification frame is received. Each of the transfer apparatuses closes, when a failure is detection, a port in which the failure is detected, transmits an open command frame for commanding to open a normally closed port from the other port other than the closed port, transfers an open command frame when the open command frame is received, and opens the normally closed port when the other port other than the closed port in which the failure is detected, the port in which the open command frame is detected, or the other port configuring a ring redundant communication path same as that of the port is the normally closed port.

17 Claims, 17 Drawing Sheets

U.S. PATENT DOCUMENTS

| | | | |
|---|---|---|---|
| 2004/0081083 A1 | 4/2004 | Sekihata | |
| 2004/0160904 A1* | 8/2004 | Enomoto et al. | 370/256 |
| 2005/0207348 A1 | 9/2005 | Tsurumi et al. | |
| 2006/0007854 A1* | 1/2006 | Yu | 370/229 |
| 2006/0209859 A1* | 9/2006 | Mutoh et al. | 370/404 |
| 2007/0002773 A1* | 1/2007 | Wang et al. | 370/258 |
| 2008/0159126 A1* | 7/2008 | Takagi et al. | 370/222 |

FOREIGN PATENT DOCUMENTS

| | | |
|---|---|---|
| JP | 2001-217754 | 8/2001 |
| JP | 2003-218894 | 7/2003 |
| JP | 2003-348108 | 12/2003 |
| JP | 2004 147172 | 5/2004 |
| JP | 2005-130049 | 5/2005 |
| JP | 2005 269059 | 9/2005 |
| JP | 2007-129606 | 5/2007 |

OTHER PUBLICATIONS

IEEE 802.1D-2004 Edition MAC bridges (Chapter 17).

RFC3619 Extreme Networks' Ethernet (registered trademark) Automatic Protection Switching (EAPS) Version 1 (2007).

Masato Ando, "LAN Switch Technology-Redundancy Method and Latest Technology-", pp. 7 to p. 9, Internet week 2003, [retrieved Mar. 16, 2007], Internet http://www.soi.wide.ad.jp/class/20030038/slides/40/index_1.html (with English translation).

Masato Ando, LAN Switch Technology-Redundancy Method and Latest Technology-, pp. 16 to p. 19, Internet week 2003, [retrieved Mar. 16, 2007], Internet http://www.soi.wide.ad.jp/class/20030038/slides/40/index_1.html (with English translation).

* cited by examiner

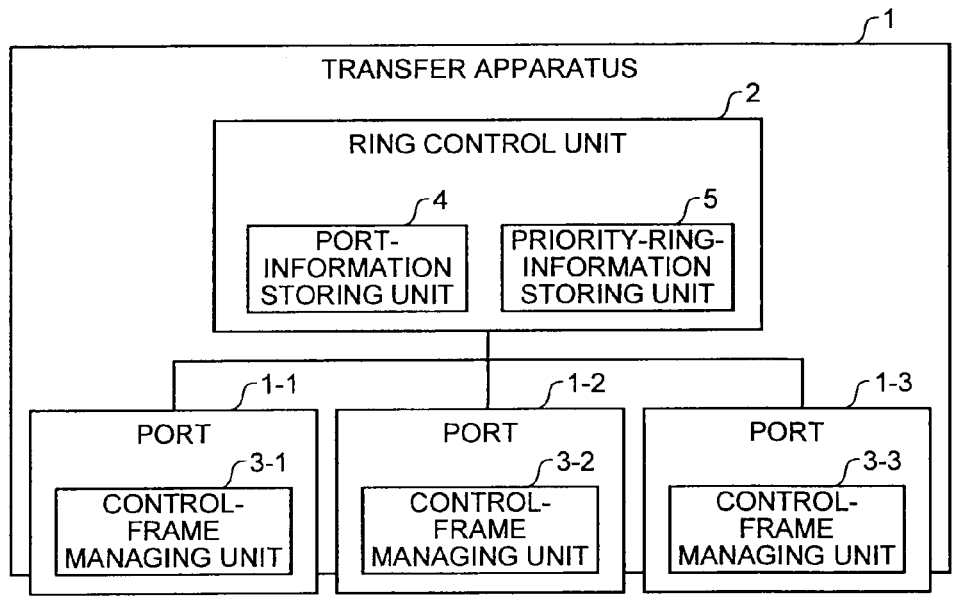

FIG.4

FORMAT OF INSPECTION FRAME 6

| DA | SA | OWN APPARATUS ID | NON-ARRIVAL FLAG | PRIORITY RING ID | NON-PRIORITY RING IDs |
|---|---|---|---|---|---|

{ ETHERNET FRAME HEADER }

FORMAT OF OPEN COMMAND FRAME 7

| DA | SA | TYPE | TRANSMISSION DESTINATION APPARATUS ID | OWN APPARATUS ID | PRIORITY RING ID | PRIORITY RING FLAG |
|---|---|---|---|---|---|---|

{ ETHERNET FRAME HEADER }

FORMAT OF RECOVERY INSPECTION FRAME 8

| DA | SA | TYPE | TRANSMISSION DESTINATION APPARATUS ID | OWN APPARATUS ID | PRIORITY RING ID | PRIORITY RING FLAG |
|---|---|---|---|---|---|---|

{ ETHERNET FRAME HEADER }

FORMAT OF RESTORATION OPEN COMMAND FRAME 9

| DA | SA | TYPE | TRANSMISSION DESTINATION APPARATUS ID | OWN APPARATUS ID | PRIORITY RING ID | PRIORITY RING FLAG |
|---|---|---|---|---|---|---|

{ ETHERNET FRAME HEADER }

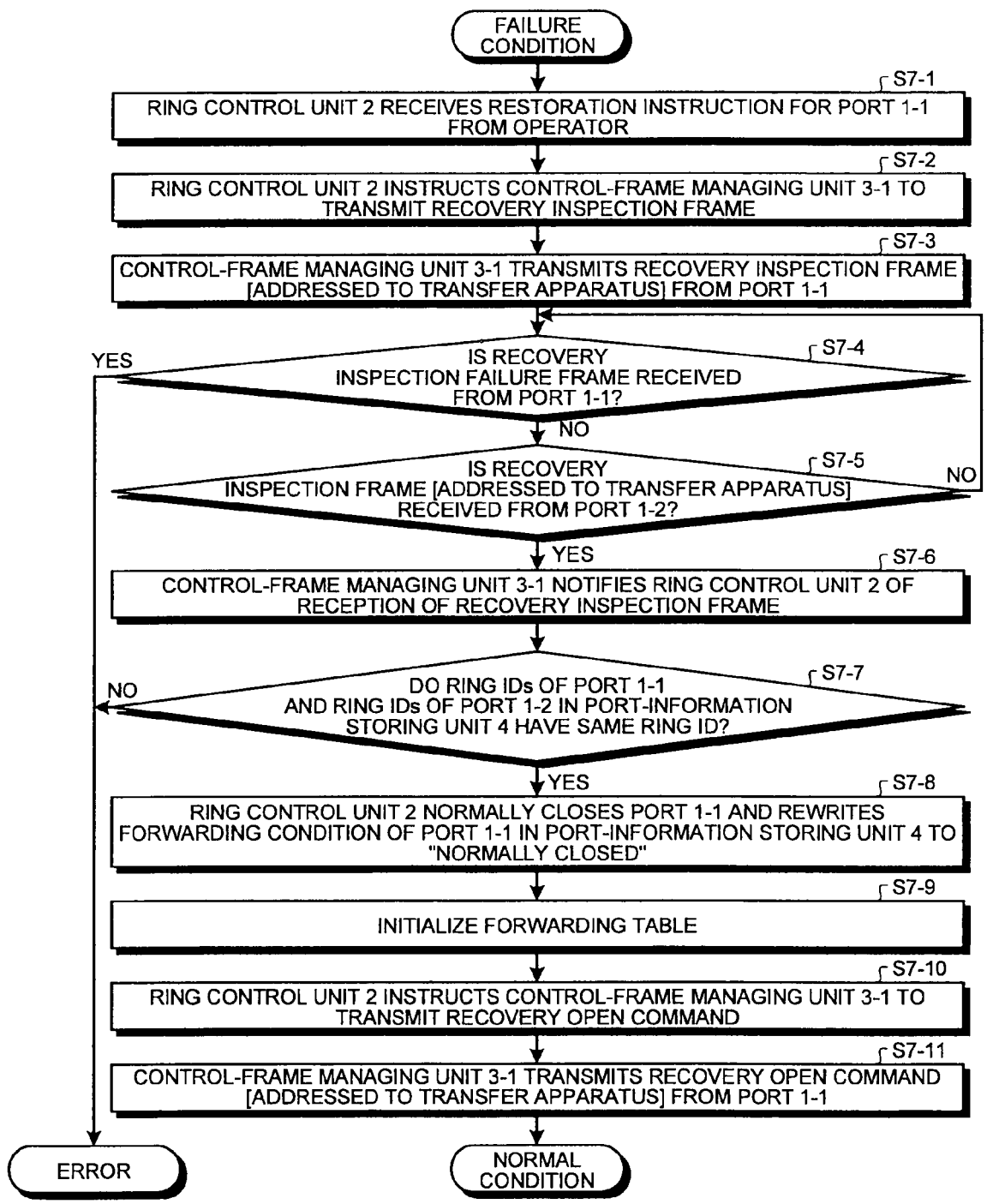

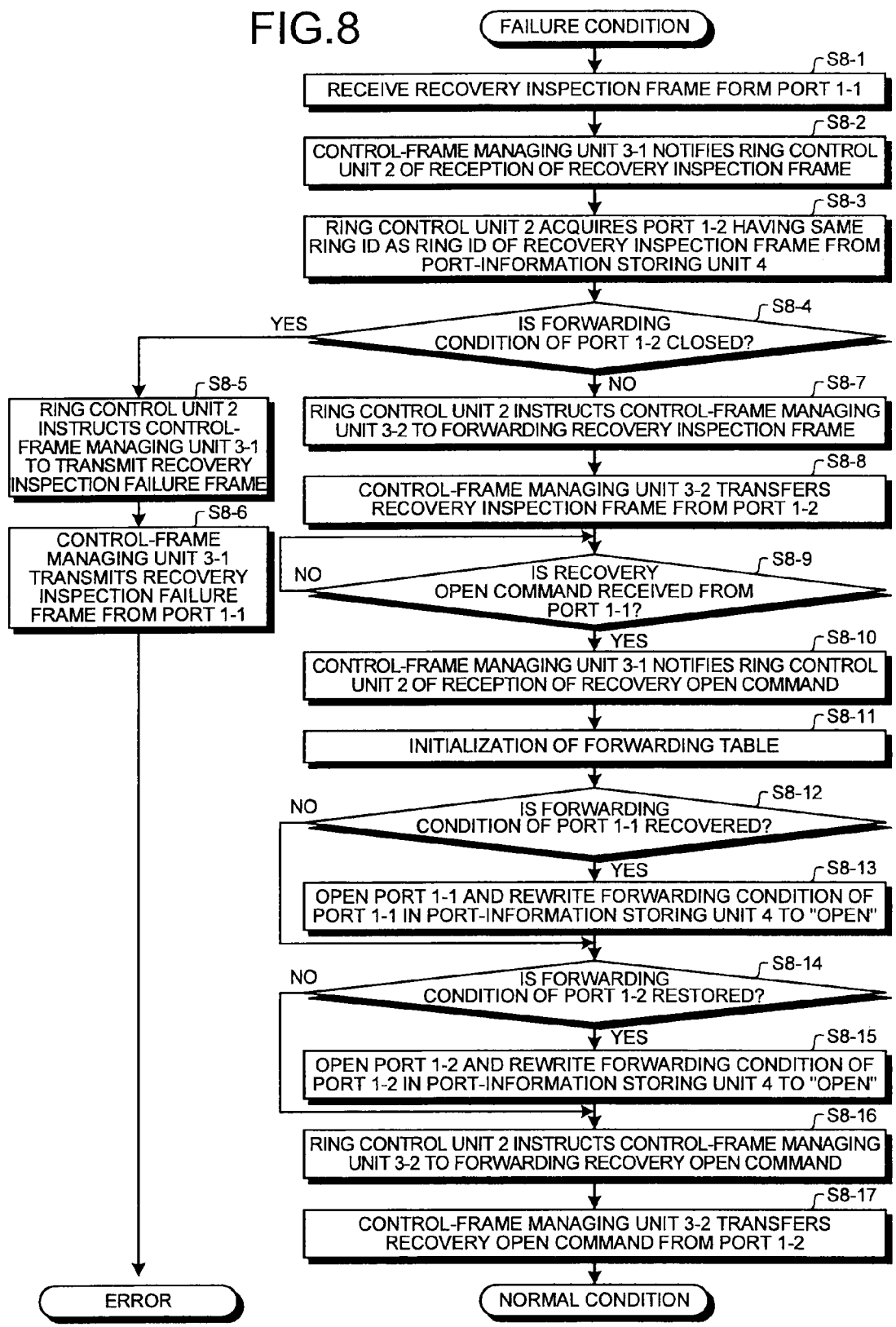

FIG.10-1

PRIORITY-RING-INFORMATION STORING UNIT 5 OF TRANSFER APPARATUS 1A

| APPARATUS ID | PRIORITY RING ID |
|---|---|
| 1A | R1 |

PORT-INFORMATION STORING UNIT 4 OF TRANSFER APPARATUS 1A

| PORT ID | ADJACENT APPARATUS ID | FORWARDING CONDITION | RING IDs |
|---|---|---|---|
| 1A-1 | 1F | OPEN | R1 |
| 1A-2 | 1B | OPEN | R1 |
| 1A-3 | NULL | NULL | NULL |

PRIORITY-RING-INFORMATION STORING UNIT 5 OF TRANSFER APPARATUS 1B

| APPARATUS ID | PRIORITY RING ID |
|---|---|
| 1B | R1 |

PORT-INFORMATION STORING UNIT 4 OF TRANSFER APPARATUS 1B

| PORT ID | ADJACENT APPARATUS ID | FORWARDING CONDITION | RING IDs |
|---|---|---|---|
| 1B-1 | 1A | OPEN | R1 |
| 1B-2 | 1C | OPEN | R1 |
| 1B-3 | NULL | NULL | NULL |

PRIORITY-RING-INFORMATION STORING UNIT 5 OF TRANSFER APPARATUS 1C

| APPARATUS ID | PRIORITY RING ID |
|---|---|
| 1C | R1 |

PORT-INFORMATION STORING UNIT 4 OF TRANSFER APPARATUS 1C

| PORT ID | ADJACENT APPARATUS ID | FORWARDING CONDITION | RING IDs |
|---|---|---|---|
| 1C-1 | 1B | OPEN | R1 |
| 1C-2 | 1D | NORMALLY CLOSED | R1 |
| 1C-3 | NULL | NULL | NULL |

FIG.10-2

PRIORITY-RING-INFORMATION STORING UNIT 5 OF TRANSFER APPARATUS 1D

| APPARATUS ID | PRIORITY RING ID |
|---|---|
| 1D | R1 |

PORT-INFORMATION STORING UNIT 4 OF TRANSFER APPARATUS 1D

| PORT ID | ADJACENT APPARATUS ID | FORWARDING CONDITION | RING IDs |
|---|---|---|---|
| 1D-1 | 1C | OPEN | R1 |
| 1D-2 | 1E | OPEN | R1, R2 |
| 1D-3 | 1G | OPEN | R2 |

PRIORITY-RING-INFORMATION STORING UNIT 5 OF TRANSFER APPARATUS 1E

| APPARATUS ID | PRIORITY RING ID |
|---|---|
| 1E | R1 |

PORT-INFORMATION STORING UNIT 4 OF TRANSFER APPARATUS 1E

| PORT ID | ADJACENT APPARATUS ID | FORWARDING CONDITION | RING IDs |
|---|---|---|---|
| 1E-1 | 1D | OPEN | R1, R2 |
| 1E-2 | 1F | OPEN | R1 |
| 1E-3 | 1K | OPEN | R2 |

PRIORITY-RING-INFORMATION STORING UNIT 5 OF TRANSFER APPARATUS 1K

| APPARATUS ID | PRIORITY RING ID |
|---|---|
| 1K | R2 |

PORT-INFORMATION STORING UNIT 4 OF TRANSFER APPARATUS 1K

| PORT ID | ADJACENT APPARATUS ID | FORWARDING CONDITION | RING IDs |
|---|---|---|---|
| 1K-1 | 1J | OPEN | R2 |
| 1K-2 | 1E | NORMALLY CLOSED | R2 |
| 1K-3 | NULL | NULL | NULL |

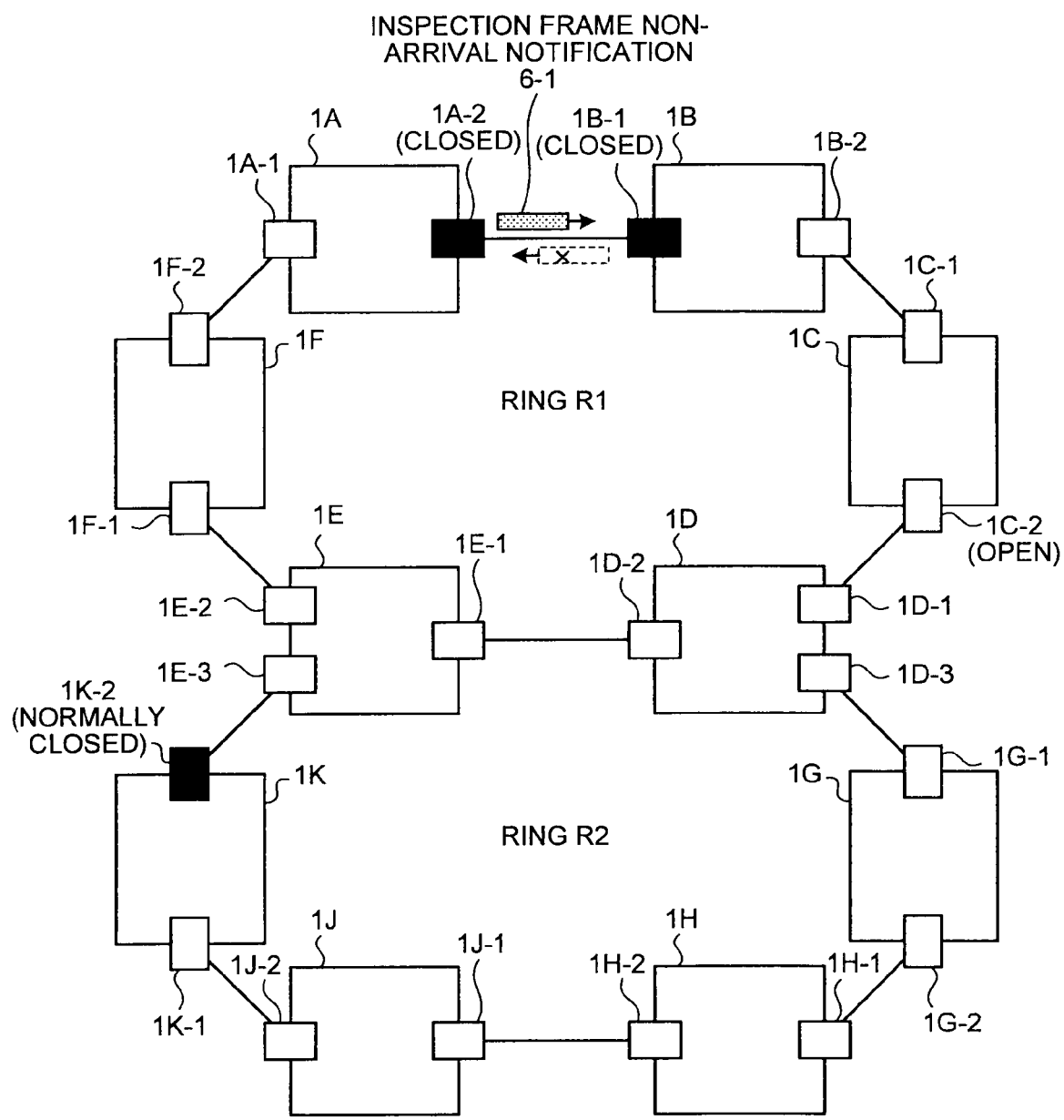

FIG. 13-1

PORT-INFORMATION STORING UNIT 4 OF TRANSFER APPARATUS 1A

| PORT ID | ADJACENT APPARATUS ID | FORWARDING CONDITION | RING IDs |
|---|---|---|---|
| 1A-1 | 1F | OPEN | R1 |
| 1A-2 | 1B | CLOSED | R1 |
| 1A-3 | NULL | NULL | NULL |

PORT-INFORMATION STORING UNIT 4 OF TRANSFER APPARATUS 1B

| PORT ID | ADJACENT APPARATUS ID | FORWARDING CONDITION | RING IDs |
|---|---|---|---|
| 1B-1 | 1A | CLOSED | R1 |
| 1B-2 | 1C | OPEN | R1 |
| 1B-3 | NULL | NULL | NULL |

PORT-INFORMATION STORING UNIT 4 OF TRANSFER APPARATUS 1C

| PORT ID | ADJACENT APPARATUS ID | FORWARDING CONDITION | RING IDs |
|---|---|---|---|
| 1C-1 | 1B | OPEN | R1 |
| 1C-2 | 1D | OPEN | R1 |
| 1C-3 | NULL | NULL | NULL |

FIG.13-2

PORT-INFORMATION STORING UNIT 4 OF TRANSFER APPARATUS 1D

| PORT ID | ADJACENT APPARATUS ID | FORWARDING CONDITION | RING IDs |
|---|---|---|---|
| 1D-1 | 1C | OPEN | R1 |
| 1D-2 | 1E | CLOSED | R1, R2 |
| 1D-3 | 1G | OPEN | R2 |

PORT-INFORMATION STORING UNIT 4 OF TRANSFER APPARATUS 1E

| PORT ID | ADJACENT APPARATUS ID | FORWARDING CONDITION | RING IDs |
|---|---|---|---|
| 1E-1 | 1D | CLOSED | R1, R2 |
| 1E-2 | 1F | OPEN | R1 |
| 1E-3 | 1K | OPEN | R2 |

PORT-INFORMATION STORING UNIT 4 OF TRANSFER APPARATUS 1K

| PORT ID | ADJACENT APPARATUS ID | FORWARDING CONDITION | RING IDs |
|---|---|---|---|
| 1K-1 | 1J | OPEN | R2 |
| 1K-2 | 1E | NORMALLY CLOSED | R2 |
| 1K-3 | NULL | NULL | NULL |

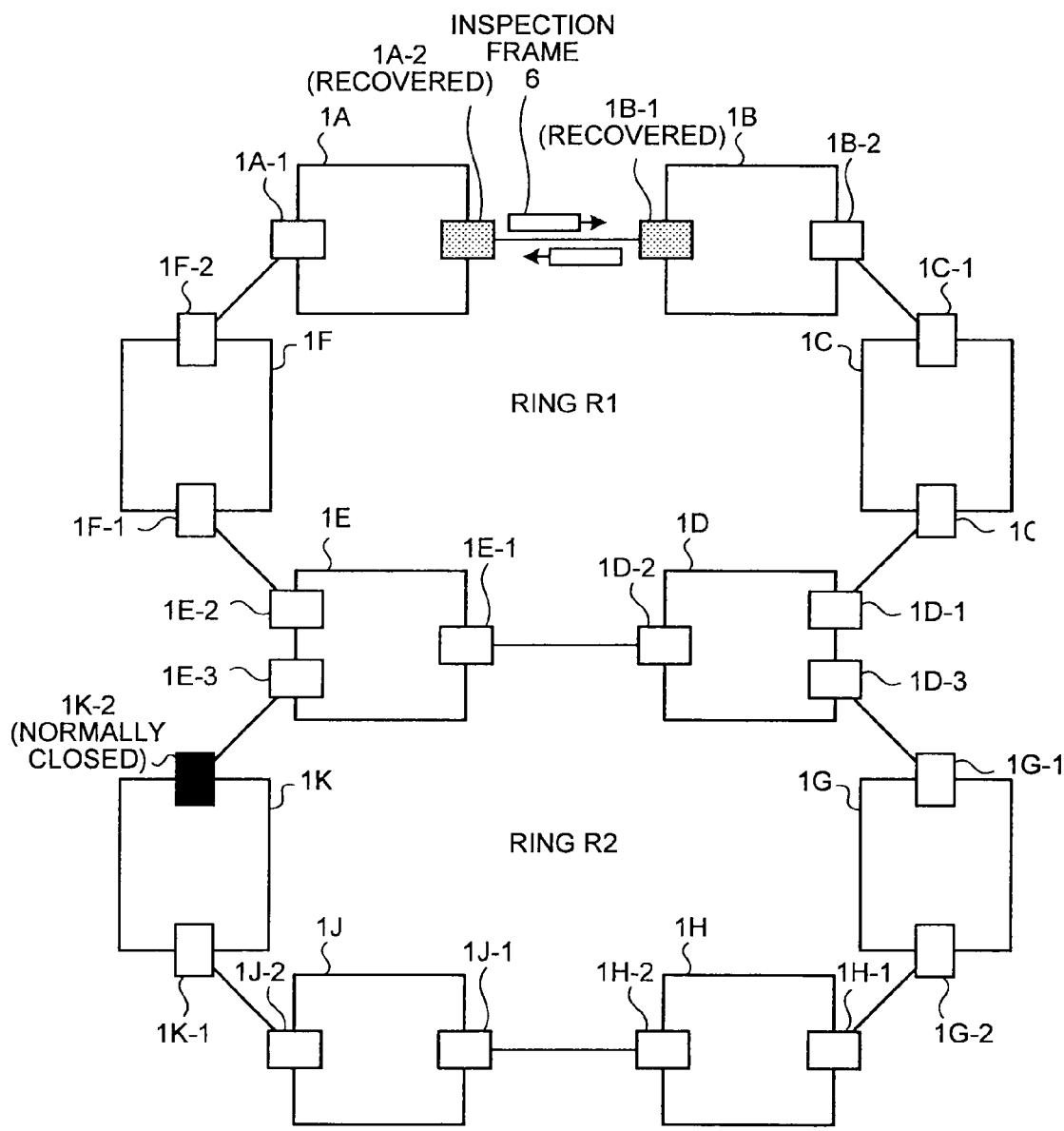

FIG.15

PORT-INFORMATION STORING UNIT 4 OF TRANSFER APPARATUS 1A

| PORT ID | ADJACENT APPARATUS ID | FORWARDING CONDITION | RING IDs |
|---|---|---|---|
| 1A-1 | 1F | OPEN | R1 |
| 1A-2 | 1B | RECOVERED | R1 |
| 1A-3 | NULL | NULL | NULL |

PORT-INFORMATION STORING UNIT 4 OF TRANSFER APPARATUS 1B

| PORT ID | ADJACENT APPARATUS ID | FORWARDING CONDITION | RING IDs |
|---|---|---|---|
| 1B-1 | 1A | RECOVERED | R1 |
| 1B-2 | 1C | OPEN | R1 |
| 1B-3 | NULL | NULL | NULL |

RING-SHAPED REDUNDANT COMMUNICATION PATH CONTROL METHOD

TECHNICAL FIELD

The present invention relates to a path control technology for making a communication path redundant and switching a communication path according to a failure condition, and, more particularly to a ring redundant communication path control method suitable for a network that realizes redundancy using a ring redundant communication path.

BACKGROUND ART

At present, in WAN (Wide Area Network) services provided by communication carriers, to improve user reliability on communication, 1+N and 1:N redundant configurations for making path in communication carrier networks redundant and switching lines when failures occur to protect user communication are widely adopted. However, to configure redundant paths with these systems, an increase in network cost due to an increase in the number of links poses a problem. Therefore, a ring redundant communication path that can be made redundant with a small number of links is actively adopted.

However, in the ring redundant communication path, when a multi-point to multi-point communication path such as a wide area Ethernet (registered trademark) is provided, ring control for logically releasing a loop and switching a path when a failure occurs is necessary.

Therefore, in spanning tree control methods such as an STP (Spanning Tree Protocol) disclosed in Non-Patent Document 1 and an RSTP (Rapid Spanning Tree Protocol) disclosed in Non-Patent Document 2, a loop configuration is logically prevented by setting a single port on a ring redundant communication path in a blocking condition.

However, in the spanning tree control methods, many kinds of parameters needs to be treated for a path calculation for determining a network configuration. Therefore, there is a problem in that path recalculation cost for path switching during a failure increases and it takes time to switch a path.

Therefore, an EAPS (Ethernet (registered trademark) Automatic Protection Switch) by a ring control system disclosed in Non-Patent Documents 3 and 4 and a switching node control method disclosed in Non-Patent Document 5, a main transfer apparatus on a ring redundant communication path closes one control port to logically prevent a loop, transmits an inspection frame that circulates through the ring redundant communication path, detects a failure when the main transfer apparatus fails to receive the inspection frame, and opens the closed control port to perform path switching to thereby realize quick path switching.

Non-Patent Document 1: IEEE 802.1D-1998 Edition MAC bridges (Chapter 8)
Non-Patent Document 2: IEEE 802.1D-2004 Edition MAC bridges (Chapter 17)
Non-Patent Document 3: RFC3619 Extreme Networks' Ethernet (registered trademark) Automatic Protection Switching (EAPS) Version 1
Non-Patent Document 4: Masato Ando, "LAN Switch Technology—Redundancy Method and Latest Technology—", pp. 7 to pp. 9, Internet week 2003, [retrieved Mar. 16, 2007], Internet http://www.soi.wide.ad.jp/class/20030038/slides/40/index_1.html
Non-Patent Document 5: Masato Ando, "LAN Switch Technology—Redundancy Method and Latest Technology—", pp. 16 to pp. 19, Internet week 2003, [retrieved Mar. 16, 2007], Internet http://www.soi.wide.ad.jp/class/20030038/slides/40/index_1.html

DISCLOSURE OF INVENTION

Problem to be Solved by the Invention

However, in the ring control system in the past, when a failure is detected, the control port of the main transfer apparatus is opened on the assumption that the loop is prevented in a failure location. Consequently, when line disconnected in one direction occurs, a loop in one direction is generated because the control port is opened regardless of the fact that a line in an opposite direction is conductive. When the inspection frame cannot be received because of a transfer delay or overflow of a transfer buffer in the transfer apparatus, a failure is detected by mistake and the control port is opened regardless of the fact that a failure does not actually occur. Consequently, a loop is generated.

To solve this problem, a method described below is conceivable. A main transfer apparatus and a sub-transfer apparatus are determined from transfer apparatuses that configure a ring redundant communication path. A control port of the main transfer apparatus is closed and a control port of the sub-transfer apparatus is opened at normal time. When a failure is detected, the control port of the sub-transfer apparatus is closed, and the sub-transfer apparatus notifies the main transfer apparatus of an opening command. The main control apparatus opens the control port after receiving the open command.

Consequently, when the line in one direction is disconnected or when the inspection frame is discarded, it is possible to prevent the generation of a loop due to misdetection of a failure.

However, in this method, a path is logically closed in two locations, i.e., a failure location and the control port of the sub-transfer apparatus, when a failure occurs. Therefore, the path is segmented into two. This method is suitable for a ladder-redundant communication path in which one line among a plurality of lines of a ring redundant communication path is used as a main path and the other lines have to be used only when a failure occurs. However, the method causes communication interruption in the ring redundant communication path in which a path should be used among all transfer apparatuses.

Therefore, it is an object of the present invention to provide a ring redundant communication method that can prevent generation of a loop and prevent occurrence of disconnection of a path during occurrence of a failure even when a line in one direction is disconnected or when an inspection frame is discarded because of a transfer delay, overflow of a transfer buffer, or the like.

Means for Solving Problem

A ring redundant communication path control method according to an aspect of the present invention is of causing, under a ring redundant communication path in which a plurality of transfer apparatuses are annularly connected by connecting two ports of a transfer apparatus to ports of transfer apparatuses adjacent thereto, respectively, and a frame transfer path for transferring frames in opposite directions is redundantly configured, a user to uniquely select the frame transfer path by setting at least one port among the ports, which annularly connect the transfer apparatuses, as a normally closed port that is closed even in a normal condition of the ring redundant communication path. The method includes, for each of the transfer apparatuses, periodically transmitting an inspection frame for inspecting a communication path between the transfer apparatus and each of the adjacent transfer apparatuses to each of the adjacent transfer apparatuses from each of the ports connected to each of the adjacent transfer apparatuses; detecting, when the inspection frame transmitted from each of the adjacent transfer apparatuses is not received for a fixed time from a port connected to the adjacent transfer apparatus, a failure of the communication path in the port and transmitting a non-arrival notification frame, which notifies that the inspection frame has not arrived yet, from the port to the adjacent transfer apparatus; detecting, when the non-arrival notification frame transmitted from each of the adjacent transfer apparatuses is received from a port connected to the transfer apparatus, a failure of the communication path in the port; closing, when a failure is detected in any one of the ports connected to each of the adjacent transfer apparatuses, the port in which the failure is detected and transmitting an open command frame for commanding to open the normally closed port from another port other than the closed port; transferring, when the open command frame is received, the open command frame from another port configuring a ring redundant communication path same as that of the port in which the open command frame is received; and opening the normally closed port when the other port other than the closed port in which the failure is detected, the port in which the open command frame is detected, or the other port configuring the ring redundant communication path same as that of the port is the normally closed port.

Consequently, a port for connecting a line or a transfer apparatus in which a failure occurs is closed and a port closed at normal time is opened. Therefore, even if a port is closed when a failure occurs, the ring redundant communication path is not segmented and switching of a path can be performed. When the inspection frame is not received for a fixed time, a transfer apparatus detects a failure and transmits inspection frame non-arrival notification to transfer apparatuses adjacent thereto. Therefore, in a line disconnected in one direction, both transfer apparatuses at both ends that connect the line can detect a failure of the line. A transfer apparatus that detects a failure closes a port in which the failure is detected. Therefore, the line disconnection in one direction can be treated in the same manner as line disconnection in both directions and generation of a one direction loop can be prevented. After the transfer apparatus that detects the failure closes the port in which the failure is detected, the transfer apparatus transmits an open command frame from another port. A transfer apparatus that receives the open command frame opens the closed port when the transfer apparatus has a closed port. Therefore, it is possible to switch the communication path and prevent generation of a loop while always keeping a logical terminal endpoint of a ring provided.

The ring redundant communication path control method may further include, for each of the transfer apparatuses, detecting, when the inspection frame is received in a port in which a failure is detected according to non-reception of the inspection frame, recovery in the port and stopping the transmission of the non-arrival notification frame from the port; and detecting, when the non-arrival notification frame is not received for a fixed time from a port in which a failure is detected according to reception of the non-arrival notification frame, recovery in the port. Consequently, the transfer apparatus can detect recovery from the failure.

In the ring redundant communication path control method, after detecting the recovery in the port in which the failure is detected, the method may further include, for each of the transfer apparatuses, transmitting, when any one of the ports of the transfer apparatus is designated as the normally closed port, a recovery inspection frame for inspecting the recovery from the designated port to the transfer apparatus itself; closing, when the recovery inspection frame addressed to the transfer apparatus itself is received, the port designated as the normally closed port and transmitting a recovery open command frame for commanding to open the port in which the recovery is detected from the closed port to the transfer apparatus itself; transferring, when a recovery inspection frame addressed to another transfer apparatus is received, the recovery inspection frame from another port configuring a ring redundant communication path same as that of a port in which the recovery inspection frame is received; and opening, when the port in which the recovery is detected is present in the transfer apparatus itself, the port when the recovery open command frame is received. Consequently, a transfer apparatus transmits the recovery open command frame after closing a port and a transfer apparatus that receives the recovery open command frame opens the closed port after receiving the recovery open command frame. Therefore, it is possible to switch the path while always keeping a logical terminal endpoint of a ring provided and prevent generation of a loop.

The ring redundant communication path control method may further include, for each of the transfer apparatuses, initializing, when the open command frame or the recovery open command frame is received, a transfer table formed by learning a transfer destination port of a frame. Consequently, when a failure occurs or a port is recovered from the failure, a transfer apparatus that receives the open command frame or the recovery open command frame initializes the transfer table. Therefore, inconsistency does not occur between a transfer path according to the transfer table involved in path switching and an actual transfer path.

In the ring redundant communication path control method, when a plurality of the ring redundant communication paths are present and configure a multi-ring redundant communication path, at least two transfer apparatuses configuring the ring redundant communication path are shared transfer apparatuses that configure another ring redundant communication path as well, one port of the shared transfer apparatuses is a shared port that configures the ring redundant communication path and the other ring redundant communication path, and the ring redundant communication path is configured by the other first port different from the shared port and the other ring redundant communication path is configured by the other second port different from the shared port, the steps may be also performed for each of the shared transfer apparatuses.

The ring redundant communication path control method may further include closing the shared port when a failure is detected in the shared port and transmitting, concerning a ring redundant communication path to which the shared port belongs and that is set as a priority ring in advance, an open command frame for commanding to open the normally closed port from the other port configuring the ring redundant communication path. Consequently, only one ring redundant communication path among a plurality of ring redundant communication paths that share a shared line is set in advance as a priority ring and, when a failure occurs in the shared line in a multi-ring redundant communication path, the open command frame is transmitted only in this priority ring to perform path switching. Therefore, it is possible to prevent generation of a super loop that extends over the ring redundant communication paths.

A ring redundant communication path control method according to another aspect of the present invention is of causing, under a ring redundant communication path in which a plurality of transfer apparatuses are annularly connected by connecting two ports of a transfer apparatus to ports of transfer apparatuses adjacent thereto, respectively, and a frame transfer path for transferring frames in opposite directions is redundantly configured, a user to uniquely select the frame transfer path by setting at least one port among the ports, which annularly connect the transfer apparatuses, as a normally closed port that is closed even in a normal condition of the ring redundant communication path. The method includes, for each of the transfer apparatuses, periodically transmitting an inspection frame for inspecting a communication path between the transfer apparatus and each of the adjacent transfer apparatuses to each of the adjacent transfer apparatuses from each of the ports connected to each of the adjacent transfer apparatuses; a step of detecting, when the inspection frame transmitted from each of the adjacent transfer apparatuses is not received for a fixed time from a port connected to the adjacent transfer apparatus, a failure of the communication path in the port and transmitting a non-arrival notification frame, which notifies that the inspection frame has not arrived yet, from the port to the adjacent transfer apparatus; detecting, when the non-arrival notification frame transmitted from each of the adjacent transfer apparatuses is received from a port connected to the transfer apparatus, a failure of the communication path in the port; transferring, when an open command frame for commanding to open the normally closed port is received, the open command frame from the other port configuring a ring redundant communication path same as that of a port that receives the open command frame, the open command frame being transmitted from one of a transfer apparatus having a port in which a failure is detected according to non-reception of the inspection frame and a transfer apparatus having a port in which a failure is detected according to reception of the non-arrival notification frame; and opening the normally closed port when the other port other than the closed port in which the failure is detected, the port in which the open command frame is detected, or the other port configuring the ring redundant communication path same as that of the port is the normally closed port. One of the transfer apparatus having the port in which the failure is detected according to non-reception of the inspection frame and the transfer apparatus having the port in which the failure is detected according to reception of the non-arrival notification frame includes a step of closing the port in which the failure is detected and transmitting an open command frame from the other port other than the closed port.

EFFECT OF THE INVENTION

As described above, according to the present invention, even when a line in one direction is disconnected or when an inspection frame is discarded because of a transfer delay, overflow of a transfer buffer, and the like, it is possible to prevent generation of a loop. Further, it is possible to prevent occurrence of segmentation of a path during occurrence of a failure.

BRIEF DESCRIPTION OF DRAWINGS

FIG. 2 is a diagram of the internal structure of a transfer apparatus.

FIG. 3 is a diagram of the structure of information stored in a port-information storing unit, a priority-ring-information storing unit, and a forwarding-table storing unit.

FIG. 4 is a diagram of a format of a control frame transferred among transfer apparatuses and used for controlling a ring.

FIGS. 6-1 and 6-2 are flowcharts of operations of a transfer apparatus at the time when a failure occurs.

FIG. 7 is a flowchart of operations of a transfer apparatus that receives a restoration instruction during recovery.

FIG. 8 is a flowchart of operations of a transfer apparatus other than the transfer apparatus that receives the restoration instruction during recovery.

FIG. 10-1 is a diagram of information stored in portion-information storing units and priority-ring-information storing units of the respective transfer apparatuses at normal time.

FIG. 10-2 is a diagram of information stored in the port-information storing units and the priority-ring-information storing units of the respective transfer apparatuses at normal time.

FIG. 11 is a diagram for explaining operations performed when a failure occurs among transfer apparatuses.

FIG. 13-1 is a diagram of information stored in the port-information storing units of the respective transfer apparatuses during a failure.

FIG. 13-2 is a diagram of information stored in the port-information storing units of the respective transfer apparatuses during a failure.

FIG. 14 is a diagram for explaining operations for restoring ports from a failure that occurs among the transfer apparatuses.

FIG. 15 is a diagram of information stored in the port-information storing units of the respective transfer apparatuses during recovery.

EXPLANATIONS OF LETTERS OR NUMERALS

Figure 1:
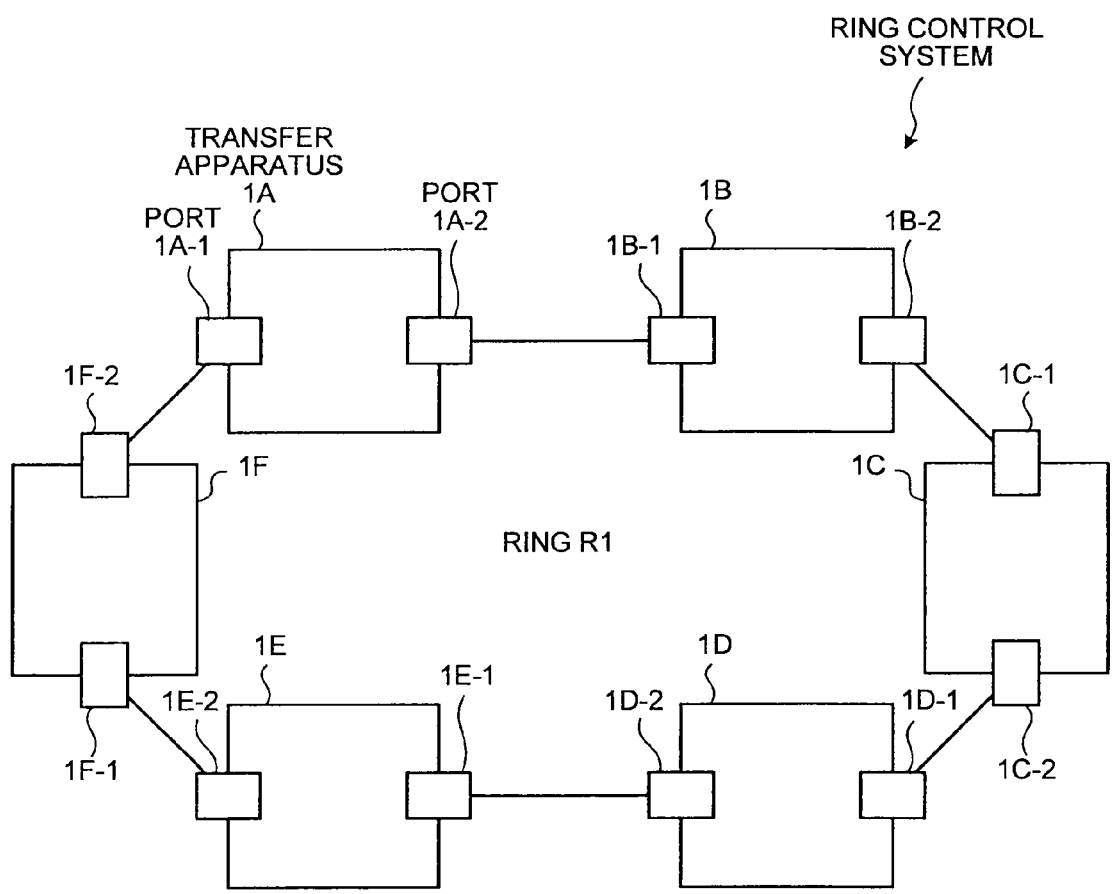
FIG. 1 is a diagram of a scene in which a ring control system according to an embodiment of the present invention is applied.

1 Transfer apparatus
1-1, 1-2, 1-3 Ports
2 Ring control unit
3, 3-1, 3-2, 3-3 Control-frame managing units
4 Port-information storing unit
5 Priority-ring-information storing unit
6 Inspection frame
6-1 Inspection frame non-arrival notification frame
7 Open command frame
8 Recovery inspection frame
9 Recovery open command frame

BEST MODE(S) FOR CARRYING OUT THE INVENTION

Embodiments of the present invention are explained in detail below with reference to the drawings.
[Configuration]
First, a configuration of a ring control system according to an embodiment of the present invention is explained in detail. FIG. 1 is a diagram of a scene in which the ring control system according to the embodiment of the present invention is applied. This ring control system includes six transfer apparatuses 1A, 1B, 1C, 1D, 1E, and 1F. The transfer apparatuses include two ports 1A-1 and 1A-2, . . . , 1F-2, respectively. The ring control system shown in FIG. 1 is only an example. The present invention is not limited by the number of transfer apparatuses and the number of ports.

The ports 1A-1, 1A-2, . . . , 1F-2 included in the transfer apparatuses 1A, 1B, 1C, 1D, 1E, and 1F are ports that belong to a ring redundant communication path R1 (a ring R1). The respective ports are connected to the transfer apparatuses adjacent to one another, whereby the ring R1 is configured.

Figures 1, 6:
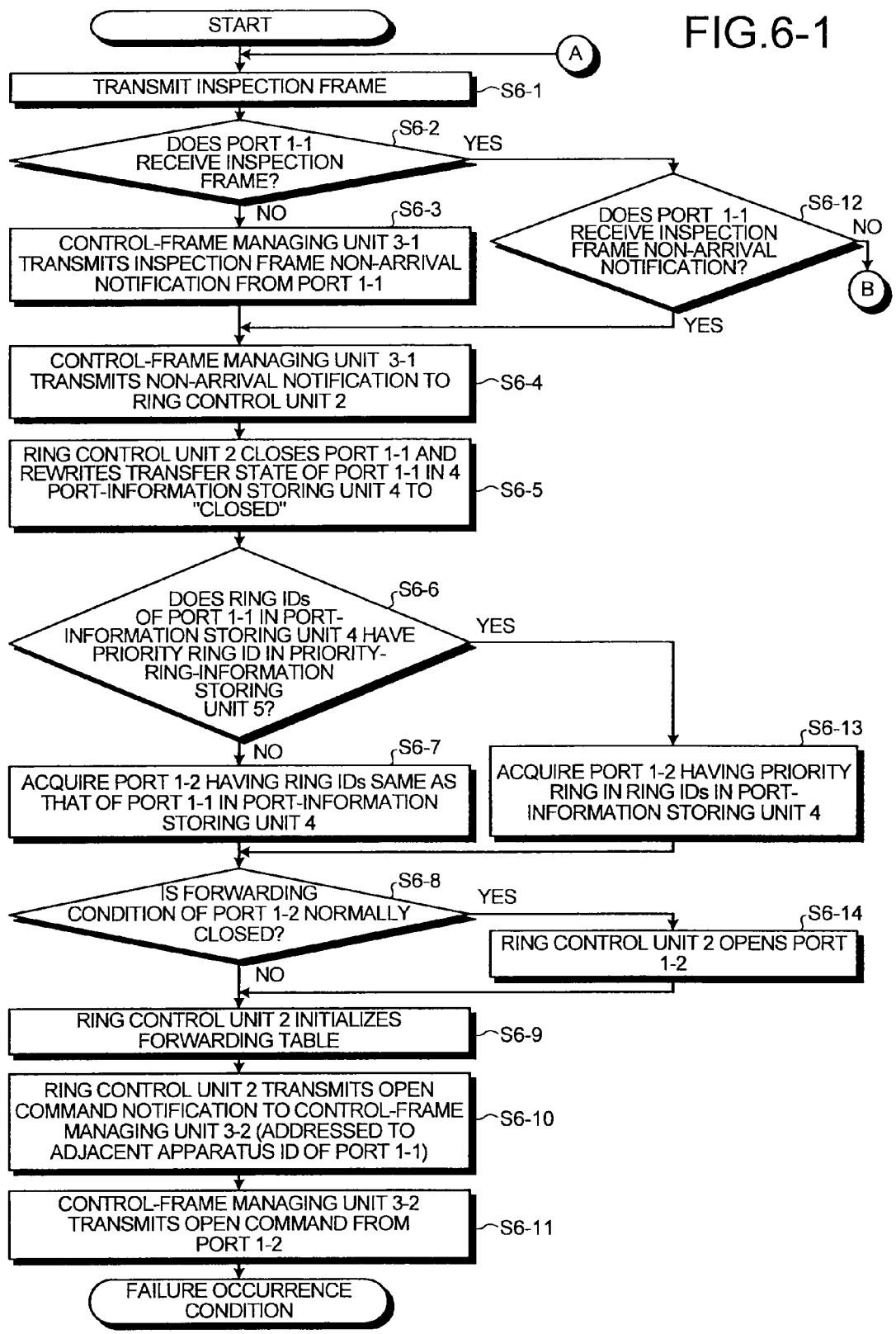
Figures 2, 6:
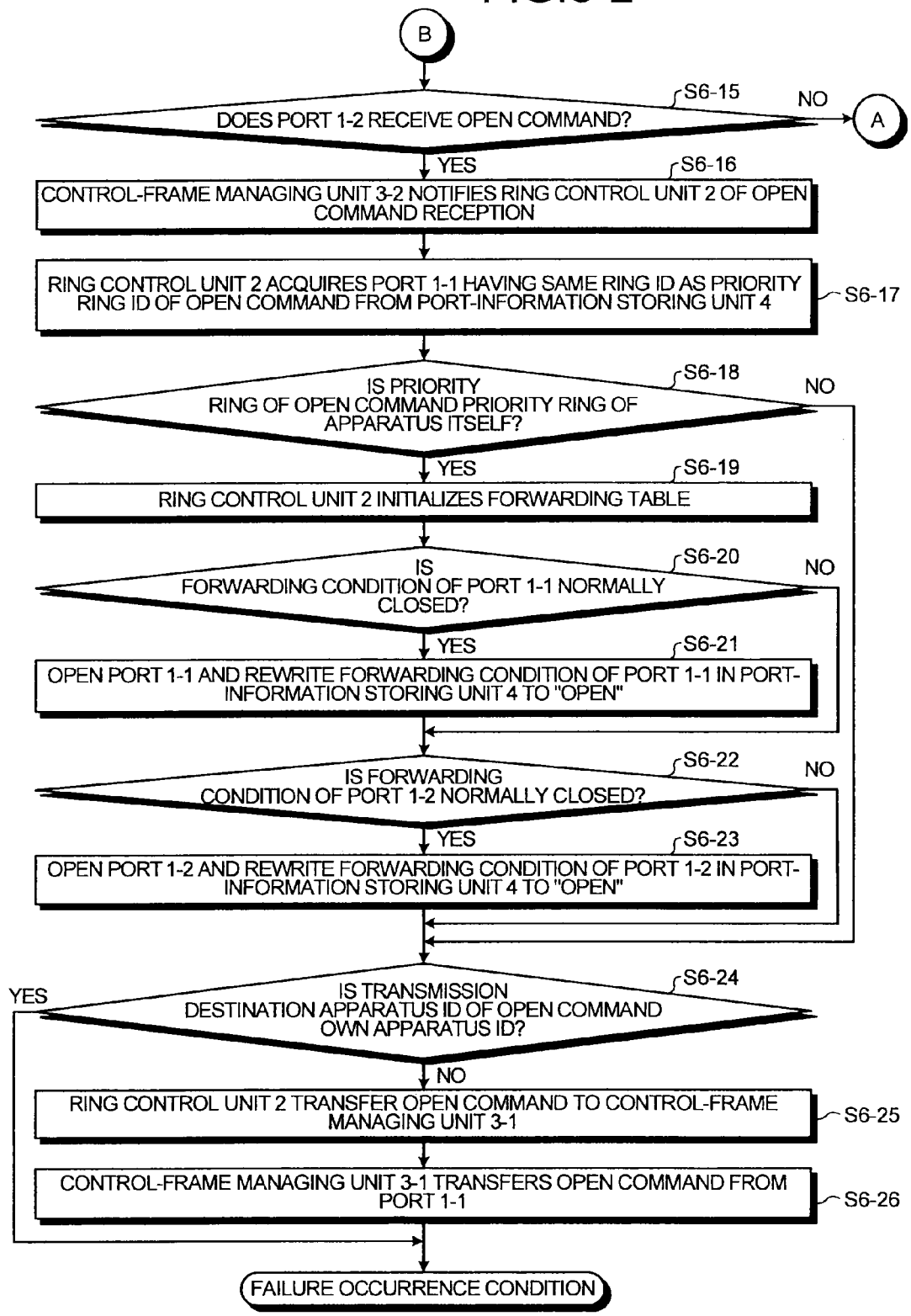

FIG. 2 is a diagram of the internal structure of the transfer apparatuses 1A, 1B, 1C, 1D, 1E, and 1F shown in FIG. 1. In this embodiment, assuming that the internal structure of the transfer apparatuses 1A, 1B, 1C, 1D, 1E, and 1F is identical, these transfer apparatuses are generally referred to as transfer apparatus 1. The transfer apparatus 1 includes ports 1-1, 1-2, and 1-3, a ring control unit 2, and control-frame managing units 3-1, 3-2, and 3-3. The ring control unit 2 includes a port-information storing unit 4, a priority-ring-information storing unit 5, and a not-shown forwarding-table storing unit. The control-frame managing units 3-1, 3-2, and 3-3 correspond to the ports 1-1, 1-2, and 1-3, respectively. The control-frame managing units 3-1, 3-2, and 3-3 transmit and receive a control frame and a normal frame (a frame including user data transmitted and received by a user who uses the ring redundant communication path) via the ports 1-1, 1-2, and 1-3.

In FIG. 2, the structure of the transfer apparatus 1 including the three ports, i.e., the ports 1-1, 1-2, and 1-3, is illustrated. However, the present invention is not limited to this. For example, when the transfer apparatus 1 is used as a transfer apparatus in a single ring control system shown in FIG. 1, the transfer apparatus 1 only has to include at least two ports. On the other hand, as described later, when the transfer apparatus 1 is used as a shared transfer apparatus in a ring control system for a multi-ring redundant communication path, the transfer apparatus 1 only has to include at least three ports. In FIG. 2, the structure of the ring control unit 2 of the transfer apparatus 1 including the priority-ring-information storing unit 5 is illustrated. However, the present invention is not limited to this. For example, when the transfer apparatus 1 is used as a transfer apparatus of the single ring control system shown in FIG. 1, the ring control unit 2 does not always have to include the priority-ring-information storing unit 5. On the other hand, as described later, when the transfer apparatus 1 is used as a shared transfer apparatus in a ring control system for a multi-ring redundant communication path, it is desirable that the ring control unit 2 includes the priority-ring-information storing unit 5.

FIG. 3 is a diagram of the structure of information stored in the port-information storing unit 4 and the priority-ring-information storing unit 5 shown in FIG. 2 and the structure of information stored in the forwarding-table storing unit not shown in FIG. 2. Port information is stored in the port-information storing unit 4. The port information includes, for each of port IDs, an adjacent apparatus ID (an ID of an adjacent transfer apparatus) connected to the port, a transfer condition (e.g., closed, open, normally closed, recovered, or NULL) of the port, and a ring IDs to which the port belongs. Priority ring information is stored in the priority-ring-information storing unit 5. The priority ring information includes a priority ring ID corresponding to the apparatus ID (the transfer apparatus ID). A transfer table stored in the forwarding-table storing unit includes information necessary for transferring a control frame and a normal frame and includes a learned transfer destination port of a frame.

For example, as shown in FIG. 3, the forwarding-table storing unit includes a reception port ID indicating a port in which the transfer apparatus 1 receives the control frame and the normal frame, information concerning a destination to which the transfer apparatus 1 transmits the control frame and the normal frame, and an output port ID indicating a port from which the transfer apparatus 1 outputs these frames. Although different from an example assumed by this embodiment, it is also conceivable that the forwarding-table storing unit includes information concerning the number of pops and cost depending on a protocol operated in a ring redundant communication path.

Terms indicating transfer conditions of a port are explained. "Closed" means a condition in which a port is closed, only the control frame is transferred, and the normal frame is not transferred. In this embodiment, when a failure of a communication path is detected in a port, the port is "closed". "Open" means a condition in which a port is open and not only the control frame but also the normal frame is transferred. In this embodiment, ports other than a "normally closed" port described later are set as "open" port in a normal condition of the ring redundant communication path. "Mainly closed" means, like "closed", a condition in which a port is closed, only the control frame is transferred, and the normal frame is not transferred. However, unlike "closed", in "normally closed", the port is closed in the normal condition of the ring redundant communication path as well for the purpose of causing a user to uniquely select a frame transfer path. "Restored" means, like "closed" and "normally closed", a condition in which a port is closed, only the control frame is transferred, and the normal frame is not transferred. In this embodiment, when recovery is detected concerning a port in which a failure is detected, the port is set as a "recovered" port. However, because the ring redundant communication path as a whole is not completely recovered yet, the normal frame is not transferred from the port.

FIG. 4 is a diagram of a format of a control frame transferred among the transfer apparatuses shown in FIGS. 1 and 2 and used for controlling a ring. An inspection frame 6 stores an Ethernet frame header (a DA/transmission destination address and an SA/transmission source address), an ID of a transfer apparatus to which the inspection frame 6 belongs, a non-arrival flag, a priority ring ID, and a non-priority ring IDs. In transmitting an inspection frame, the transfer apparatus 1 transmits the inspection frame with the non-arrival flag set to "OFF". In transmitting inspection frame non-arrival notification, the transfer apparatus 1 transmits the inspection frame non-arrival notification with the non-arrival flag set to "ON". The transfer apparatus 1 transfers the inspection frame, the non-arrival flag of which is set to "ON", as inspection frame non-arrival notification 6-1. Each of an open command frame 7, a recovery inspection frame 8, and a recovery open command frame 9 stores an Ethernet frame header (a DA/transmission destination address and an SA/transmission source address), a type, an ID of a transfer apparatus at a transmission destination, an ID of a transfer apparatus to which the frame belongs, a priority ring ID, and a non-priority ring flag. According to this type, the open command frame 7, the recovery inspection frame 8, and the recovery open command frame 9 are distinguished. Although not shown in FIG. 4, the control frame includes a recovery inspection failure frame as well.

In FIG. 2, the ring control unit 2 of the transfer apparatus 1 has the following functions:
(1) a function of controlling the ports 1-1 to 1-3 to be in conditions of "closed", "open", "normally closed", and "recovered";
(2) a function of storing a result of port control in the transfer condition in the port-information storing unit 4;

(3) a function of transferring a control frame from the other port belonging to the same ring to which a port that receives the control frame belongs (e.g., in FIG. 1, when a port 1A-1 of the transfer apparatus 1A receives a control frame, the control frame is transferred from the port 1A-2.);

(4) a function of initializing the transfer table stored in the not-shown forwarding-table storing unit;

(5) a function of closing, when the inspection frame 6 is not received in the port or when the inspection frame non-arrival notification 6-1 is received in the port, the port and, then, transmitting the open command frame 7 from the other port belonging to the same ring to which the port belongs;

(6) a function of opening, when the open command frame 7 is received, a port, a transfer condition of which in the port-information storing unit 4 is "normally closed";

(7) a function of transmitting, when a port is designated and a restoration instruction is inputted according to operation by a user, the recovery inspection frame 8, receiving the recovery inspection frame 8 from the other port, setting the designated port to "normally closed", and, then, transmitting the recovery open command frame 9 from the port; and (8) a function of opening, when the recovery open command frame 9 is received, a port, a transfer condition of which in the port-information storing unit 4 is "recovered".

A control-frame managing unit 3 (the control-frame managing units 3-1, 3-2, and 3-2 are generally referred to as control-frame managing unit 3 below) of the transfer apparatus 1 has the following functions:

(1) a function of notifying, when a control frame is received from a port, the ring control unit 2 of the control frame;

(2) a function of transmitting the control frame from a port according to a control frame transmission instruction from the ring control unit 2; and (3) a function of transferring, when a transfer condition of a port is "open", a control frame and a normal frame from the other port belonging to the same ring to which the port belongs and transferring, when a transfer condition of the port is "normally closed", "closed", or "recovered", only the control frame and not transferring the normal frame.

[Operations]

Figure 5:
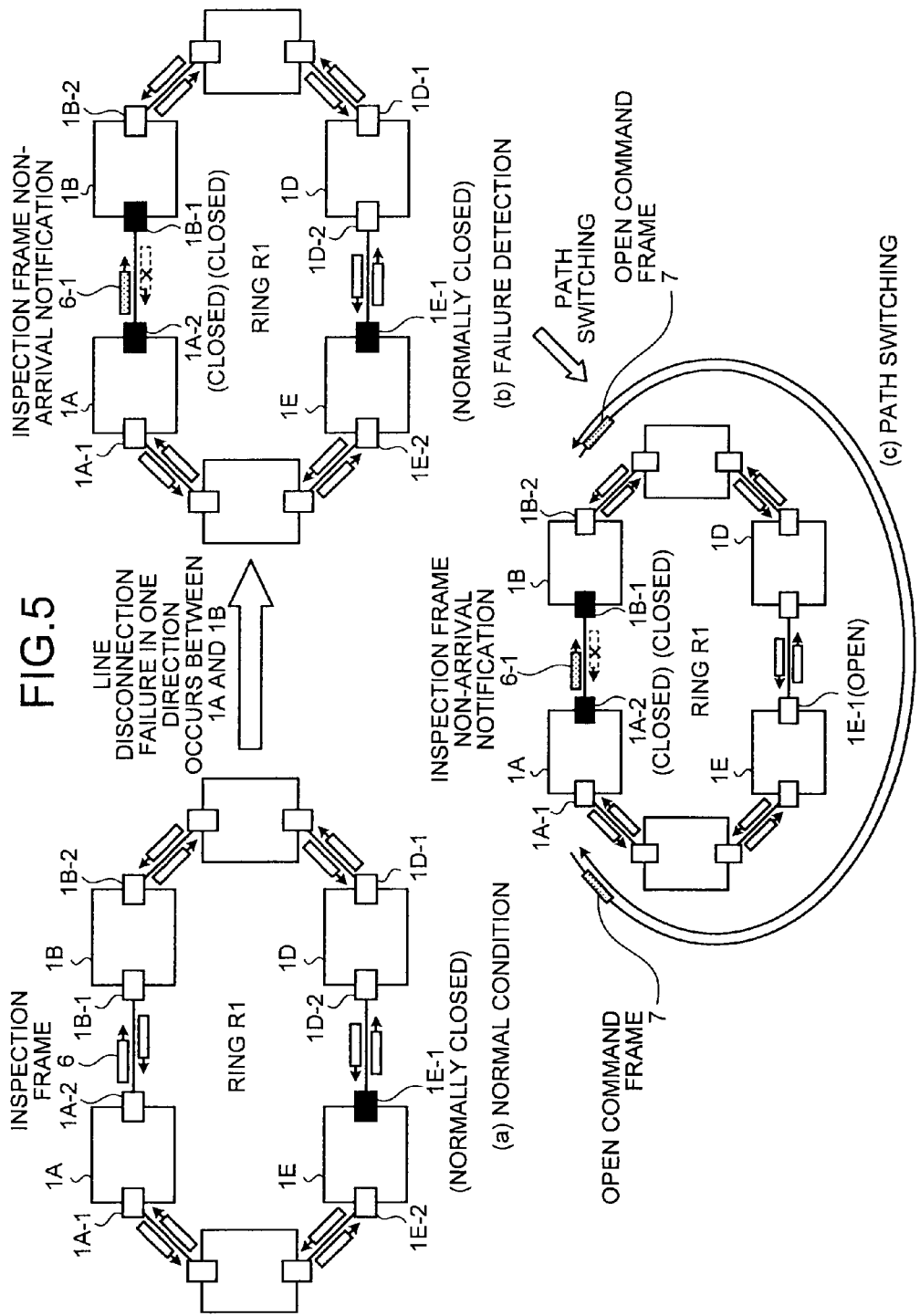
FIG. 5 is a diagram of an overview of operations of the ring control system according to the embodiment of the present invention.

Operations of the ring control system according to the embodiment of the present invention are explained in detail. FIG. 5 is a diagram of an overview of operations of the ring control system shown in FIG. 1. Operation conditions during a normal condition, during failure detection, and during path switching are shown in FIGS. 5(a), 5(b), and 5(c), respectively.

In FIG. 5(a), the respective transfer apparatuses transmit and receive the inspection frame 6 to and from the transfer apparatuses adjacent thereto one another. It is assumed that the port 1E-1 of the transfer apparatus 1E is in the condition of "normally closed". As described in the function (3) of the control-frame managing unit 3 of the transfer apparatus 1, the transfer apparatus 1E transmits and receives control frames such as the inspection frame 6 and the open command frame 7 to and from the transfer apparatus 1D via the "normally closed" port 1E-1. However the transfer apparatus 1E does not transmit and receive a normal frame. Consequently, because the physical ring R1 configuring the ring control system logically has a terminal endpoint, a loop by the normal frame is not generated.

Operations performed when a line is disconnected in a direction from the transfer apparatus 1B to the transfer apparatus 1A between the transfer apparatus 1A and the transfer apparatus 1B in FIG. 5(b) are explained referring to FIGS. 6-1 and 6-2. In the following explanation, please note that reference numerals and signs are different between FIG. 5 and FIGS. 6-1 and 6-2 and the reference numerals and signs in FIGS. 6-1 and 6-2 conform to those in FIG. 2. When the line is disconnected in the direction from the transfer apparatus 1B to the transfer apparatus 1A, because the transfer apparatus 1A fails to receive the inspection frame 6 for a fixed time via the port 1A-2 (step S6-2), the transfer apparatus 1A detects a failure in the port 1A-2. In this case, when a transfer delay of the inspection frame 6 or overflow of a transfer buffer in the transfer apparatus 1A occurs, a failure is also detected. The transfer apparatus 1A transmits the inspection frame non-arrival notification 6-1 from the port 1A-2 in which the failure is detected (step S6-3). The transfer apparatus 1A closes the port 1A-2 in which the failure is detected and rewrites the transfer condition in the port-information storing unit 4 to "closed" (step S6-5). On the other hand, when the transfer apparatus 1B receives the inspection frame non-arrival notification 6-1 via the port 1B-1 (steps S6-12 and S6-4), the transfer apparatus 1B detects a failure in the port 1B-1. The transfer apparatus 1B closes the port 1B-1 in which the failure is detected and rewrites the transfer condition in the port-information storing unit 4 to "closed" (step S6-5).

Operations for performing path switching in FIG. 5(c) are explained referring to FIGS. 6-1 and 6-2. The transfer apparatus 1A and the transfer apparatus 1B transmit the open command frames 7 via the other ports 1A-1 and 1B-2 belonging to the same ring R1 to which the ports 1A-2 and 1B-1, in which the failures are detected, belong (steps S6-6 to S6-11). On the other hand, transfer apparatuses that receive the open command frames 7 initialize transfer tables and transfer the open command frames 7 via another port belonging to the same ring R1 to which the ports that receive the open command frames 7 belong (steps S6-15 to S6-26). In this case, when the transfer apparatus 1E that has the "normally closed" port 1E-1 receives the open command frame 7, the port 1E-1 initializes the transfer table (step S6-19) and transfers the open command frame 7 via another port (step S6-26) as described above. In addition, the transfer apparatus 1E "opens" the "normally closed" port 1E-1 and rewrites the transfer condition in the port-information storing unit 4 to "open" (steps S6-20 to S6-23).

In the port 1A-2 in which the failure is detected according to non-reception of the inspection frame 6 for the fixed period, thereafter, the inspection frame 6 is received. Then, the ring control unit 2 of the transfer apparatus 1A detects recovery from the failure and rewrites the transfer condition in the port-information storing unit 4 to "recovered". In this case, when the port 1A-2 is recovered from the failure, the control-frame managing unit 3-1 of the transfer apparatus 1A stops the transmission of the inspection frame non-arrival notification 6-1 from the port 1A-2. On the other hand, in the transfer apparatus 1B that detects the failure according to reception of the inspection frame non-arrival notification 6-1, thereafter, the inspection frame non-arrival notification 6-1 is not received via the port 1B-1 for a fixed time. Then, the ring control unit 2 of the transfer apparatus 1B detects recovery from the failure and rewrites the transfer condition in the port-information storing unit 4 to "recovered".

According to the operations shown in FIG. 5 and FIGS. 6-1 and 6-2, when a line is disconnected in a direction from the port 1B-1 of the transfer apparatus 1B to the port 1A-2 of the transfer apparatus 1A, the ports 1B-1 and 1A-2 are closed and the "normally closed" port 1E-1 of the transfer apparatus 1E is "opened". Consequently, when a line is disconnected in one direction, it is possible to switch a path while preventing generation of a one direction loop. Further, it is possible to secondarily prevent occurrence of segmentation of a path and secure a path among all the transfer apparatuses on the ring redundant communication path.

Operations performed when a line is disconnected in the direction from the transfer apparatus 1B to the transfer apparatus 1A between the transfer apparatus 1A and the transfer apparatus 1B in FIG. 5(*b*) and operations for performing path switching are explained more in detail referring to FIGS. 6-1 and 6-2. In the following explanation, operations in the transfer apparatus 1A, operations in the transfer apparatus 1B, operations in another transfer apparatus other than the transfer apparatuses 1A, 1B, and 1E, and operations in the transfer apparatus 1E having the normally closed port are explained in order. In the following explanation, it is assumed that the port 1A-2 of the transfer apparatus 1A shown in FIG. 5 is a "port 1-1", the port 1A-1 of the transfer apparatus 1A shown in FIG. 5 is a "port 1-2", the port 1B-1 of the transfer apparatus 1B shown in FIG. 5 is a "port 1-1", the port 1B-2 of the transfer apparatus 1B shown in FIG. 5 is a "port 1-2", the port 1E-1 of the transfer apparatus 1E shown in FIG. 5 is a "port 1-1", and the port 1E-2 of the transfer apparatus 1E shown in FIG. 5 is a "port 1-2". The operations explained below are only examples and operations of the present invention are not limited to these operations.

First, the operations in the transfer apparatus 1A are explained. The transfer apparatus 1A transmits and receives the inspection frame 6 to and from the transfer apparatus 1B adjacent thereto via the port 1-1 (the port 1A-2) (step S6-1). The transfer apparatus 1A judges whether the port 1-1 (the port 1A-2) has received the inspection frame 6 (step S6-2). Therefore, when the line is disconnected in the direction from the transfer apparatus 1B to the transfer apparatus 1A, the transfer apparatus 1A judges that the port 1-1 (the port 1A-2) has not received the inspection frame 6 ("No" at step S6-2).

Then, the transfer apparatus 1A transmits, in the control-frame managing unit 3-1, the non-arrival notification frame 6-1, which notifies that the inspection frame has not arrived, from the port 1-1 (the port 1A-2) to the transfer apparatus 1B (step S6-3). The transfer apparatus 1A notifies, in the control-frame managing unit 3-1, the ring control unit 2 that the non-arrival notification frame 6-1 is transmitted (step S6-4). Then, the transfer apparatus 1A closes, in the ring control unit 2, the port 1-1 (the port 1A-2) in which a failure is detected and rewrites the transfer condition of the port 1-1 (the port 1A-2) in the port-information storing unit 4 to "closed" (step S6-5).

Subsequently, the transfer apparatus 1A judges whether the ring IDs of the port 1-1 (the port 1A-2) in the port-information storing unit 4 has the priority ring ID in the priority-ring-information storing unit 5 (step S6-6). In this embodiment, both of the ring IDs in the port-information storing unit 4 and the priority ring ID in the priority-ring-information storing unit 5 are "R1" ("Yes" at step S6-6), the transfer apparatus 1A acquires the port 1-2 (the port 1A-1) that holds "R1" in the ring IDs in the port-information storing unit 4 (step S6-13).

The transfer apparatus 1A judges whether the transfer condition of the acquired port 1-2 (the port 1A-1) is "normally closed" (step S6-8). In this embodiment, the transfer condition of the port 1-2 (the port 1A-1) is not "normally closed" ("No" at step S6-8). Therefore, the transfer apparatus 1A initializes, in the ring control unit 2, the forwarding-table storing unit (step S6-9). Subsequently, the transfer apparatus 1A instructs the control-frame managing unit 3-2 to transmit the open command frame 7 for commanding to open the normally closed port from the port 1-2 (the port 1A-1) (step S6-10). At this point, it is assumed that a destination is the transfer apparatus 1B that is an apparatus adjacent to the port 1-1 (the port 1A-2). Thereafter, the transfer apparatus 1A transmits, in the control-frame managing unit 3-2, the open command frame 7 from the port 1-2 (the port 1A-1) (step S6-11).

The operations in the transfer apparatus 1B are explained. Like the transfer apparatus 1A, the transfer apparatus 1B transmits and receives the inspection frame 6 to and from the transfer apparatus 1A adjacent thereto via the port 1-1 (the port 1B-1) (step S6-1). The transfer apparatus 1B judges whether the port 1-1 (the port 1B-1) has received the inspection frame 6 (step S6-2). The transfer apparatus 1B also judges whether the port 1-1 (the port 1B-1) has received the non-arrival notification frame 6-1 (step S6-12). When a line is disconnected in the direction from the transfer apparatus 1B to the transfer apparatus 1A, the transfer apparatus 1B judges that the port 1-1 (the port 1B-1) has received the non-arrival notification frame 6-1 ("Yes" at step S6-12).

Thereafter, like the transfer apparatus 1A, the transfer apparatus 1B notifies, in the control-frame managing unit 3-1, the ring control unit 2 that the non-arrival notification frame 6-1 is received (step S6-4). The transfer apparatus B closes, in the ring control unit 2, the port 1-1 (the port 1B-1) in which a failure is detected and rewrites the transfer condition of the port 1-1 (the port 1B-1) in the port-information storing unit 4 to "closed" (step S6-5). The transfer apparatus 1B judges whether the ring IDs of the port 1-1 (the port 1B-1) in the port-information storing unit 4 has the priority ring ID in the priority-ring-information storing unit 5 (step S6-6). The transfer apparatus 1B acquires the port 1-2 (the port 1B-2) that has "R1" in the ring IDs in the port-information storing unit 4 (step S6-13). The transfer apparatus 1B judges whether the transfer condition of the acquired port 1-2 (the port 1B-2) is "normally closed" (step S6-8). The transfer apparatus 1B initializes, in the ring control unit 2, the forwarding-table storing unit (step S6-9). The transfer apparatus 1B instructs the control-frame managing unit 3-2 to transmit the open command frame 7 for commanding opening of the normally closed port from the port 1-2 (the port 1B-2) (step S6-10). The transfer apparatus 1B transmits, in the control-frame managing unit 3-2, the open command frame 7 from the port 1-2 (the port 1B-2) (step S6-11). At this point, it is assumed that a destination is the transfer apparatus 1A that is an apparatus adjacent to the port 1-1 (the port 1B-1).

The operations in another transfer apparatus other than the transfer apparatuses 1A, 1B, and 1E are explained. The other transfer apparatus judges whether the port 1-2 has received the open command frame 7 (or the port 1-1 may have received the open command frame 7 but, in the following explanation, it is assumed that the port 1-2 has received the open command frame 7) (step S6-15). Therefore, when the line is disconnected in the direction from the transfer apparatus 1B to the transfer apparatus 1A, the other transfer apparatus judges that the port 1-2 has received the open command frame 7 ("Yes" at step S6-15).

Then, the other transfer apparatus notifies, in the control-frame managing unit 3-2, the ring control unit 2 that the open command frame 7 is received (step S6-16). The other transfer apparatus acquires, in the ring control unit 2, the port 1-1 having the same ring ID as the priority ring ID of the open command frame 7 from the port-information storing unit 4 (step S6-17).

Subsequently, the other transfer apparatus judges whether a priority ring in which opening of the normally closed port is commanded in the open command frame 7 is the same as a priority ring of the other transfer apparatus (step S6-18). In this embodiment, both the priority rings are the same ("Yes"

at step S6-18). Therefore, the other transfer apparatus initializes, in the ring control unit 2, the forwarding-table storing unit (step S6-19).

The other transfer apparatus judges whether the transfer condition of the port 1-1 is normally closed (step S6-20). In this embodiment, the transfer condition is not normally closed ("No" at step S6-20). Therefore, the other transfer apparatus judges whether the transfer condition of the port 1-2 is normally closed (step S6-22). In this embodiment, the transfer condition is not normally closed ("No" at step S6-22). Therefore, the other transfer apparatus subsequently judges whether an apparatus ID at a transmission destination of the open command frame 7 is an apparatus ID of the other transfer apparatus (step S6-24).

In this embodiment, the ID at the transmission destination of the open command frame 7 is the transfer apparatus 1B or the transfer apparatus 1A as described above. Therefore, the other transfer apparatus judges that the apparatus ID at the transmission destination of the open command frame 7 is not the apparatus ID of the other transfer apparatus ("No" at step S6-24). Then, the other transfer apparatus instructs, in the ring control unit 2, the control-frame managing unit 3-1 to transfer the open command frame 7 (step S6-25). Thereafter, the other transfer apparatus transfers, in the control-frame managing unit 3-1, the open command frame 7 from the port 1-1 (step S6-26).

The operations in the transfer apparatus 1E having the normally closed port are explained. Like the other transfer apparatus, the transfer apparatus 1E judges whether the port 1-2 has received the open command frame 7 (or the port 1-1 may have received the open command frame 7 but, in the following explanation, it is assumed that the port 1-2 has received the open command frame 7) (step S6-15). When a line is disconnected in the direction from the transfer apparatus 1B to the transfer apparatus 1A, the transfer apparatus 1E judges that the port 1-2 has received the open command frame 7 ("Yes" at step S6-15). Then, like the other transfer apparatus, the transfer apparatus 1E notifies, in the control-frame managing unit 3-2, the ring control unit 2 that the open command frame 7 is received (step S6-16). The transfer apparatus 1E acquires, in the ring control unit 2, the port 1-1 (the port 1E-1) having the same ring ID as the priority ring ID of the open command frame 7 from the port-information storing unit 4 (step S6-17). The transfer apparatus 1E judges whether a priority ring in which opening of the normally closed port is commanded in the open command frame 7 is the same as a priority ring of the transfer apparatus 1E (step S6-18). The transfer apparatus 1E initializes, in the ring control unit 2, the forwarding-table storing unit (step S6-19).

Like the other transfer apparatus, the transfer apparatus 1E judges whether the transfer condition of the port 1-1 (the port 1E-1) is normally closed (step S6-20). In this embodiment, the transfer condition of the port 1-1 (the port 1E-1) is normally closed ("Yes" at step S6-20). Therefore, the transfer apparatus 1E opens the port 1-1 (the port 1E-1) and rewrites the transfer condition of the port 1-1 (the port 1E-1) in the port-information storing unit 4 to "open" (step S6-21).

Thereafter, the transfer apparatus 1E judges whether the transfer condition of the port 1-2 is normally closed (step S6-22). The transfer condition of the port 1-2 is not normally closed ("No" at step S6-22). Therefore, like the other transfer apparatus, the transfer apparatus 1E judges whether the apparatus ID at the transmission destination of the open command frame 7 is the apparatus ID of the transfer apparatus 1E (step S6-24). The transfer apparatus 1E judges that the apparatus ID at the transmission destination of the open command frame 7 is not the apparatus ID of the transfer apparatus 1E ("No" at step S6-24). Therefore, the transfer apparatus 1E instructs, in the ring control unit 2, the control-frame managing unit 3-1 to transfer the open command frame 7 (step S6-25). The transfer apparatus 1E transfers, in the control-frame managing unit 3-1, the open command frame 7 from the port 1-1 (the 1E-1 port) (step S6-26).

The operations for path switching performed when a failure of line disconnection occurs have been explained according to the flowchart shown in FIGS. 6-1 and 6-2. Operations performed from the time when a port is recovered from a failure until the port returns to a normal condition are explained referring to a flowchart shown in FIG. 7.

In the ring redundant communication path control method according to the present invention, any one of ports of any one of transfer apparatuses among a plurality of transfer apparatuses configuring a ring redundant communication path is designated as a normally closed port. Concerning this designation, the port may be designated according to operation by an operator or it may be designated in advance which port should be set as a normally closed port during recovery. In the following explanation, the port is designated according to operation by the operator. However, the present invention can be applied to both the cases in the same manner. In the former case, it is conceivable that an operation for recovery is started with the designation performed according to the operation by the operator as an opportunity. On the other hand, in the latter case, it is conceivable that a transfer apparatus having a designated port automatically starts an operation for recovery explained below or starts the operation under some condition. When a port is designated according to the operation by the operator, the operator may directly operate a transfer apparatus having a port designated as a normally closed port or may operate the transfer apparatus according to communication from a remote location. However, the present invention can be applied to both the cases in the same manner.

Moreover, concerning which transfer apparatus is selected as a transfer apparatus having a port designated as a normally closed port, for example, there are a method of reselecting a transfer apparatus originally having a normally closed port like the transfer apparatus 1E in the example described above and a method of selecting another transfer apparatus. However, the present invention can be applied to both the methods in the same manner. In the following explanation, it is not clearly indicated which transfer apparatus is selected as a transfer apparatus having a port designated as a normally closed port. First, operations in a selected transfer apparatus are explained. Then, operations in another transfer apparatus are explained.

In the operations, it is assumed that, in FIG. 2, the transfer condition of the port 1-1 of the transfer apparatus 1 changes to "closed" and, then, changes to "recovered" according to detection of a failure. In FIG. 7, the ring control unit 2 receives a restoration instruction, which designates the port 1-1, according to operation by the operator (step S7-1). The ring control unit 2 notifies the control-frame managing unit 3-1 of a transmission instruction for the recovery inspection frame 8 (step S7-2).

The control-frame managing unit 3-1 transmits, via the port 1-1, the recovery inspection frame 8 addressed to the transfer apparatus to which the control-frame managing unit 3-1 belongs (step S7-3).

The control-frame managing unit 3-1 judges whether a recovery inspection failure frame is received via the port 1-1 and whether the recovery inspection frame 8 addressed to the transfer apparatus to which the control-frame managing unit 3-1 belongs is received (steps S7-4 and S7-5). When the recovery inspection failure frame is received, the control-frame managing unit 3-1 judges that the same ring redundant communication path is not recovered from occurrence of a failure and performs error processing. When the recovery inspection frame 8 is received from the port 1-2 (step S7-5), the control-frame managing unit 3-1 notifies the ring control unit 2 that the recovery inspection frame 8 is received (step S7-6).

As described later, in a transfer apparatus that detects a failure, a port, a transfer condition of which is "closed" according to detection of the failure, is not rewritten to "recovered" yet and is still "closed". Therefore, the recovery inspection failure frame is transmitted by the transfer apparatus to notify that the port is not recovered yet.

The control-frame managing unit 3 judges whether the ring IDs of the port 1-1 and the ring IDs of the port 1-2 in the port-information storing unit 4 have the same ring ID (step S7-7). When the ring IDs of the port 1-1 and the ring IDs of the port 1-2 do not have the same ring ID, the control-frame managing unit 3 performs error processing. When the ring IDs of the port 1-1 and the ring IDs of the port 1-2 have the same ring ID, the ring control unit 2 sets the port 1-1 to "normally closed" and rewrites the transfer condition of the port 1-1 in the port-information storing unit 4 to "normally closed" (step S7-8). The ring control unit 2 initializes the transfer table (step S7-9) and notifies the control-frame managing unit 3-1 of a transmission instruction for the recovery open command frame 9 (step S7-10). The control-frame managing unit 3-1 transmits, via the port 1-1, the recovery open command frame 9 addressed to the transfer apparatus to which the control-frame managing unit 3-1 belongs (step S7-11). Consequently, the port 1-1 is recovered from a failure condition to a normal condition.

Operations of another apparatus 1 until a port is recovered from a failure and returns to a normal condition in the recovery operation shown in FIG. 7 are explained referring to a flowchart shown in FIG. 8. In the operations, the recovery inspection frame 8 and the recovery open command frame 9 transmitted at steps S7-3 and S7-10 shown in FIG. 7 are received via the port 1-1 of the transfer apparatus 1 (this transfer apparatus 1 is different from the transfer apparatus 1 shown in FIG. 7). In FIG. 8, the control-frame managing unit 3-1 receives the recovery inspection frame 8 via the port 1-1 (step S8-1). The control-frame managing unit 3-1 notifies the ring control unit 2 that the recovery inspection frame 8 is received (step S8-2). The ring control unit 2 acquires, from the port-information storing unit 4, a port ID (the port 1-2) having the same ID as the ring ID of the recovery inspection frame 8 (step S8-3).

The ring control unit 2 judges, from the port-information storing unit 4, whether the transfer condition of the port 1-2 is "closed" (step S8-4). When the transfer condition of the port 1-2 is "closed", the ring control unit 2 notifies the control-frame managing unit 3-1 that the recovery inspection failure frame is to be transmitted (step S8-5). The control-frame managing unit 3-1 transmits the recovery inspection failure frame via the port 1-1 (step S8-6). When the transfer condition of the port 1-2 is not "closed" (i.e., when the transfer condition is "open" because a failure is not detected or when the transfer condition is "recovered"), the ring control unit 2 notifies the control-frame managing unit 3-2 that the recovery inspection frame 8 is to be transferred (step S8-7). The control-frame managing unit 3-2 transfers the recovery inspection frame 8 via the port 1-2 (step S8-8).

The control-frame managing unit 3-1 receives the recovery open command frame 9 via the port 1-1 (step S8-9). The control-frame managing unit 3-1 notifies the ring control unit 2 that the recovery open command frame 9 is received (step S8-10). The ring control unit 2 initializes the transfer table (step S8-11) and judges, from the port-information storing unit 4, whether the transfer condition of the port 1-1 is "recovered" (step S8-12). When the transfer condition is "recovered", the ring control unit 2 opens the port 1-1 and rewrites the transfer condition in the port-information storing unit 4 to "open" (step S8-13). The ring control unit 2 judges whether the transfer condition of the port 1-2 is "recovered" (step S8-14). When the transfer condition of the port 1-2 is "recovered", the ring control unit 2 opens the port 1-2 and rewrites the transfer condition in the port-information storing unit 4 to "open" (step S8-15). The ring control unit 2 notifies the control-frame managing unit 3-2 of the transfer of the recovery open command frame 9 (step S8-16). The control-frame managing unit 3-2 transfers the recovery open command frame 9 via the port 1-2 (step S8-17).

In the example explained above, in a transfer apparatus that detects a failure, when a port is not recovered from the failure yet, the transfer apparatus transmits a recovery inspection failure frame. A transfer apparatus that transmits a recovery inspection frame receives the recovery inspection failure frame and performs error processing. However, the present invention is not limited to this. For example, in a transfer apparatus that detects a failure, when a port is not recovered from the failure yet, the transfer apparatus can simply discard a received recovery inspection frame without transmitting a recovery inspection failure frame. Then, the recovery inspection frame is not transferred to transfer apparatuses that follow the transfer apparatus. Eventually, a transfer apparatus that transmits the recovery inspection frame does not receive the recovery inspection frame. Therefore, the transfer apparatus does not perform processing for recovery (processing for setting a designated port as a normally closed port, etc.). According to this method, for example, the transfer apparatus that transmits the recovery inspection frame periodically transmits the recovery inspection frame and, when the recovery inspection frame is received, performs processing for recovery. This makes it possible to always monitor a situation concerning whether recovery can be performed.

[Operation/Multi-Ring Redundant Communication Path]

Figure 9:
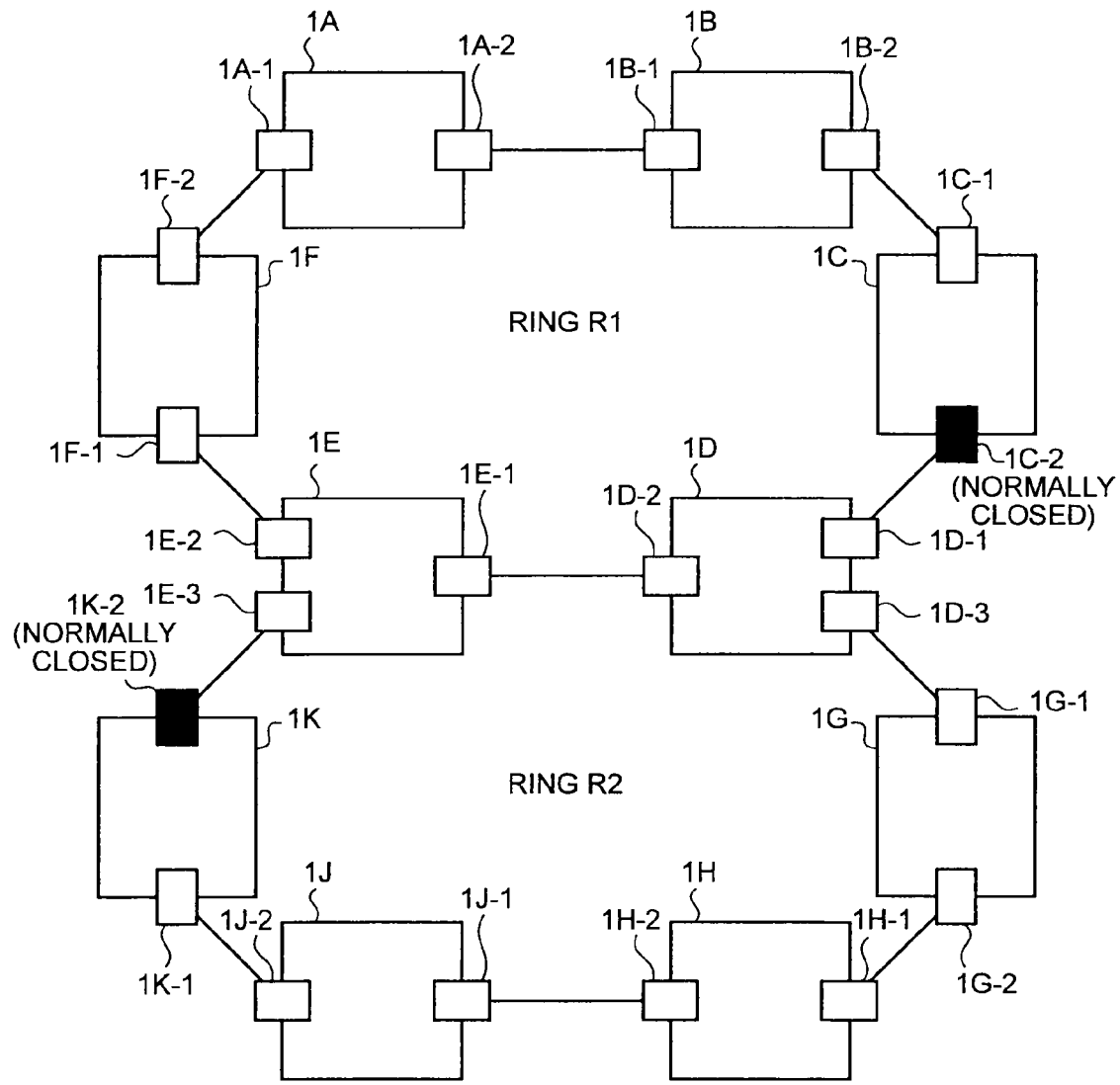
FIG. 9 is a diagram of a connection form of a multi-ring redundant communication path that has a shared port.

The operations of the ring control system for the single ring redundant communication path have been explained referring to FIGS. 1 to 8. Operations of a ring control system for a multi-ring redundant communication path are explained referring to FIGS. 9 to 15. FIG. 9 is a diagram of an overview of operations at normal time of the ring control system for the multi-ring redundant communication path. This ring control system includes ten transfer apparatuses 1A, 1B, 1C, 1D, 1E, 1F, 1G, 1H, 1J, and 1K. The transfer apparatuses include ports shown in FIG. 9, respectively. This ring control system is only an example. The present invention is not limited by the number of transfer apparatuses and the number of ports.

Ports included in the transfer apparatuses 1A, 1B, 1C, and 1F, ports 1D-1 and 1D-2 included in the transfer apparatus 1D, and ports 1E-1 and 1E-2 included in the transfer apparatus 1E are ports belonging to one ring R1 in the multi-ring redundant communication path. The respective ports are connected to the transfer apparatuses adjacent thereto, whereby the ring R1 is configured. Ports included in the transfer apparatuses 1G, 1H, 1J, and 1K, ports 1D-3 and 1D-2 included in the transfer apparatus 1D, and ports 1E-1 and 1E-3 included in the transfer apparatus 1E are ports belonging to one ring R2 in the multi-ring redundant communication path. The respective ports are connected to the transfer apparatuses adjacent thereto, whereby the ring R2 is configured. The number of rings configured by this ring control system is two. However, the present invention is not limited by this number of rings.

The port 1D-2 of the transfer apparatus 1D and the port 1E-1 of the transfer apparatus 1E are shared ports. In the ring R1, a normally closed port is set in the port 1C-2 of the transfer apparatus 1C. In the ring R2, a normally closed port is set in the port 1K-2 of the transfer apparatus 1K. In this way, communication paths of all the transfer apparatuses are uniquely controlled.

FIGS. 10-1 and 10-2 are diagrams of respective kinds of information stored in the port-information storing units 4 and the priority-ring-information storing units 5 of the transfer apparatuses at the normal time shown in FIG. 9. It is seen that, in the port-information storing units 4, the transfer conditions of the normally closed port 1C-2 of the transfer apparatus 1C and the normally closed port 1K-2 of the transfer apparatus 1K among the ports shown in FIG. 9 are "normally closed" and transfer conditions of the other ports are "open".

Figure 12:
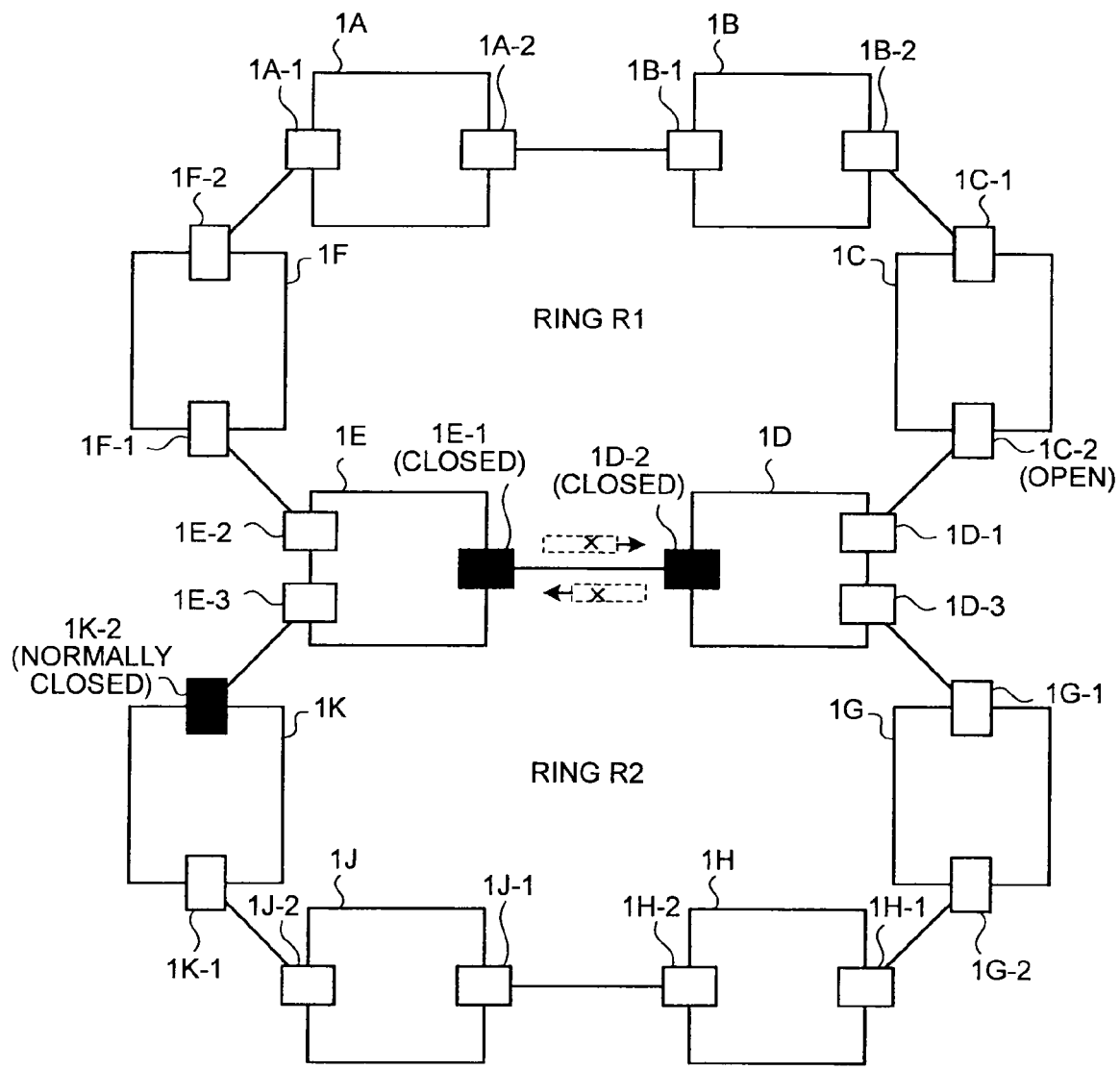
FIG. 12 is a diagram for explaining operations performed when a failure occurs in a shared line.

FIG. 11 is a diagram of operations performed when a line is disconnected in a direction from the transfer apparatus 1B to the transfer apparatus 1A and a failure occurs between the transfer apparatus 1A and the transfer apparatus 1B. FIG. 12 is a diagram of operations performed when a failure occurs in a shared line between the transfer apparatus 1D and the transfer apparatus 1E. FIGS. 13-1 and 13-2 are diagrams of respective kinds of information stored in the port-information storing units 4 of the transfer apparatuses during the failure shown in FIGS. 11 and 12. It is seen that, in the port-information storing units 4, during the failure shown in FIG. 11, the transfer conditions of the port 1A-2 of the transfer apparatus 1A and the port 1B-1 of the transfer apparatus 1B are rewritten from "open" to "closed" and the transfer condition of the port 1C-2 of the transfer apparatus 1C is rewritten from "normally closed" to "open". It is seen that, during the failure shown in FIG. 12, the transfer conditions of the port 1D-2 of the transfer apparatus 1D and the port 1E-1 of the transfer apparatus 1E are rewritten from "open" to "closed" and the transfer condition of the port 1C-2 of the transfer apparatus 1C is rewritten from "normally closed" to "open".

FIG. 14 is a diagram of operations performed when a line is disconnected in a direction from the transfer apparatus 1B to the transfer apparatus 1A and a failure occurs between the transfer apparatus 1A and the transfer apparatus 1B shown in FIG. 11 and, then, ports are recovered from the failure. FIG. 15 is a diagram of respective kinds of information stored in the port-information storing units 4 of the transfer apparatuses 1A and 1B during the recovery shown in FIG. 14. It is seen that, in the port-information storing units 4, the transfer conditions of the port 1A-2 of the transfer apparatus 1A and the port 1B-1 of the transfer apparatus 1B are rewritten from "closed" to "recovered" during the recovery shown in FIG. 14.

Operations performed by the transfer apparatus 1A when a line is disconnected in the direction from the transfer apparatus 1B to the transfer apparatus 1A and a failure occurs between the transfer apparatus 1A and the transfer apparatus 1B are explained referring to FIGS. 11, 13-1, and 10-1. The transfer apparatus 1A fails to receive the inspection frame 6 via the port 1A-2. Therefore, the control-frame managing unit 3-2 transmits the inspection frame non-arrival notification 6-1 via the port 1A-2. The control-frame managing unit 3-2 notifies the ring control unit 2 that the inspection frame non-arrival notification 6-1 is transmitted. The ring control unit 2 closes the port 1A-2 and rewrites the transfer condition of the port 1A-2 in the port-information storing unit 4 to "closed" (see FIG. 13-1). According to the port-information storing unit 4, the ring IDs of the port 1A-2 is "R1" and the priority ring ID in the priority-ring-information storing unit 5 of the transfer apparatus 1A is also "R1" (see FIGS. 10-1 and 13-1). Therefore, the ring control unit 2 acquires, from the port-information storing unit 4, the "port 1A-1" having "R1" in the ring IDs other than the port 1A-2 and "1B" of the adjacent apparatus ID of the port 1A-2. Moreover, the ring control unit 2 initializes the transfer table. The ring control unit 2 notifies the control-frame managing unit 3-1 that the open command frame 7 with the priority ring ID set to R1 is to be transmitted to the transfer apparatus 1B. The control-frame managing unit 3-1 transmits the open command frame 7 [addressed to 1B] [R1] via the port 1A-1.

Similarly, operations performed by the transfer apparatus 1B when a line is disconnected in the direction from the transfer apparatus 1B to the transfer apparatus 1A and a failure occurs between the transfer apparatus 1A and the transfer apparatus 1B are explained referring to FIGS. 11, 13-1, and 10-1. When the control-frame managing unit 3-1 of the transfer apparatus 1B receives the inspection frame non-arrival notification 6-1 via the port 1B-1, the control-frame managing unit 3-1 notifies the ring control unit 2 that inspection frame non-arrival notification 6-1 is received. The ring control unit 2 closes the port 1B-1 and rewrites the transfer condition of the port 1B-1 in the port-information storing unit 4 to "closed" (see FIG. 13-1). According to the port-information storing unit 4, the ring IDs of the port 1B-1 is "R1" and the priority ring ID in the priority-ring-information storing unit 5 of the transfer apparatus 1B is also "R1" (see FIGS. 10-1 and 13-1). Therefore, the ring control unit 2 acquires, from the port-information storing unit 4, the "port 1B-2" having "R1" in the ring IDs other than the port 1B-1 and "1A" of the adjacent apparatus ID of the port 1B-1. Moreover, the ring control unit 2 initializes the transfer table. The ring control unit 2 notifies the control-frame managing unit 3-2 that the open command frame 7 with the priority ring ID set to R1 is to be transmitted to the transfer apparatus 1A. The control-frame managing unit 3-2 transmits the open command frame 7 [addressed to 1A] [R1] via the port 1B-2.

Similarly, operations performed by the transfer apparatus 1C when a line is disconnected in the direction from the transfer apparatus 1B to the transfer apparatus 1A and a failure occurs between the transfer apparatus 1A and the transfer apparatus 1B and the transfer apparatus 1C receives the open command frame 7 [addressed to 1A] [R1] from the transfer apparatus 1B are explained referring to FIGS. 11, 13-1, and 10-1. When the control-frame managing unit 3-1 of the transfer apparatus 1C receives the open command frame 7 [addressed to 1A] [R1] via the port 1C-1, the control-frame managing unit 3-1 notifies the ring control unit 2 that open command frame 7 is received. The ring control unit 2 acquires, from the port-information storing unit 4, the port ID "port 1C-2" of a port having "R1" in the ring IDs other than the port 1C-1 that receives the open command frame 7 (see FIGS. 10-1 and 13-1). The transfer condition of the port 1C-2 is not "closed" and the priority ring ID "R1" of the open command frame 7 and the priority ring ID "R1" in the priority-ring-information storing unit 5 of the transfer apparatus 1C coincide with each other (see FIG. 13-1). Therefore, the ring control unit 2 initializes the transfer table. Moreover, because the transfer condition of the port 1C-2 is "normally closed", the ring control unit 2 opens the port 1C-2 and rewrites the transfer condition of the port 1C-2 in the port-information storing unit 4 to "open" (see FIG. 13-1). The ring control unit 2 notifies the control-frame managing unit 3-2 that the open command frame 7 with the priority ring ID set to R1 is to be transferred to the transfer apparatus 1A. The control-frame managing unit 3-2 transfers the open command frame 7 [addressed to 1A] [R1] via the port 1C-2.

Similarly, operations performed by the transfer apparatus 1D when a line is disconnected in the direction from the transfer apparatus 1B to the transfer apparatus 1A and a failure occurs between the transfer apparatus 1A and the transfer apparatus 1B and the transfer apparatus 1D receives the open command frame 7 [addressed to 1A] [R1] from the transfer apparatus 1C are explained referring to FIGS. 11 and 10-2. When the control-frame managing unit 3-1 of the transfer apparatus 1D receives the open command frame 7 [addressed to 1A] [R1] via the port 1D-1, the control-frame managing unit 3-1 notifies the ring control unit 2 that open command frame 7 is received. The ring control unit 2 acquires, from the port-information storing unit 4, the port ID "port 1D-2" of a port having "R1" in the ring IDs other than the port 1D-1 that receives the open command frame 7 (see FIG. 10-2). The transfer condition of the port 1D-2 is not "closed" and the priority ring ID "R1" of the open command frame 7 and the priority ring ID "R1" in the priority-ring-information storing unit 5 of the transfer apparatus 1C coincide with each other (see FIG. 10-2). Therefore, the ring control unit 2 initializes the transfer table. The ring control unit 2 notifies the control-frame managing unit 3-2 that the open command frame 7 with the priority ring ID set to R1 is to be transferred to the transfer apparatus 1A. The control-frame managing unit 3-2 transfers the open command frame 7 [addressed to 1A] [R1] via the port 1D-2. The transfer apparatuses 1E and 1F operate in the same manner as the transfer apparatus 1D.

According to the operations described above, path switching is performed when a failure is detected in a port other than the shared ports 1D-2 and 1E-1. This makes it possible to keep a communicatable condition among all the transfer apparatuses on the multi-ring redundant communication path shown in FIG. 11. The ports 1A-2 and 1B-1 in which line disconnection in one direction is detected are closed and the normally closed port 1C-2 is opened by the open command frame 7. This makes it possible to prevent generation of a one direction loop due to the line disconnection in one direction and generation of a both direction loop due to misdetection of a failure.

Operations performed by the transfer apparatus 1D when a line is disconnected in both directions and a failure occurs between the transfer apparatus 1E and the transfer apparatus 1D are explained referring to FIGS. 12, 13-2, and 10-2. The transfer apparatus 1D fails to receive the inspection frame 6 via the port 1D-2. Therefore, the control-frame managing unit 3-2 transmits the inspection frame non-arrival notification 6-1 via the port 1D-2. The control-frame managing unit 3-2 notifies the ring control unit 2 that the inspection frame non-arrival notification 6-1 is transmitted. The ring control unit 2 closes the port 1D-2 and rewrites the transfer condition of the port 1D-2 in the port-information storing unit 4 to "closed" (see FIG. 13-2). According to the port-information storing unit 4, the ring IDs of the port 1D-2 is "R1, R2" and the priority ring ID in the priority-ring-information storing unit 5 of the transfer apparatus 1D is "R1" (see FIG. 10-2). Therefore, the ring control unit 2 acquires, from the port-information storing unit 4, the "port 1D-1" having "R1" in the ring IDs other than the port 1D-2 and "1E" of the adjacent apparatus ID of the port 1D-2. Moreover, the ring control unit 2 initializes the transfer table. The ring control unit 2 notifies the control-frame managing unit 3-1 that the open command frame 7 with the priority ring ID set to R1 is to be transmitted to the transfer apparatus 1E. The control-frame managing unit 3-1 transmits the open command frame 7 [addressed to 1E] [R1] via the port 1D-1. The transfer apparatus E operates in the same manner as the transfer apparatus 1D.

Similarly, operations performed by the transfer apparatus 1C when a line is disconnected in both directions and a failure occurs between the transfer apparatus 1E and the transfer apparatus 1D and the transfer apparatus 1C receives the open command frame 7 [addressed to 1E] [R1] from the transfer apparatus 1D are explained referring to FIGS. 12, 13-1, and 10-1. When the control-frame managing unit 3-2 of the transfer apparatus 1C receives the open command frame 7 [addressed to 1E] [R1] via the port 1C-2, the control-frame managing unit 3-2 notifies the ring control unit 2 that open command frame 7 is received. The ring control unit 2 acquires, from the port-information storing unit 4, the port ID "port 1C-1" of a port having "R1" in the ring IDs other than the port 1C-2 that receives the open command frame 7 (see FIG. 10-1). The transfer condition of the port 1C-1 is not "closed" and the priority ring ID "R1" of the open command frame 7 and the priority ring ID "R1" in the priority-ring-information storing unit of the transfer apparatus 1C coincide with each other (see FIG. 10-1). Therefore, the ring control unit 2 initializes the transfer table. Moreover, because the transfer condition of the port 1C-2 is "normally closed", the ring control unit 2 opens the port 1C-2 and rewrites the transfer condition of the port 1C-2 in the port-information storing unit 4 to "open" (see FIG. 13-1). The ring control unit 2 notifies the control-frame managing unit 3-1 that the open command frame 7 with the priority ring ID set to R1 is to be transferred to the transfer apparatus 1E. The control-frame managing unit 3-1 transfers the open command frame 7 [addressed to 1E] [R1] via the port 1C-1.

According to the operations described above, when a failure occurs between the shared port 1D-2 and 1E-1 of the multi-ring redundant communication path, path switching is performed only in the priority ring R1 as shown in FIG. 12. Consequently, because the normally closed port 1K-2 is not opened in the ring R2, it is possible to prevent generation of a super loop that extends over a plurality of ring redundant communication paths.

Operations performed by the transfer apparatus 1C when the ports 1A-2 and 1B-1 are recovered from a failure that occurs between the transfer apparatus 1A and the transfer apparatus 1B and a restoration instruction, which designates the port 1C-2, is inputted are explained referring to FIG. 14. The ring control unit 2 of the transfer apparatus 1C inputs a restoration instruction for the port 1C-2 according to operation by the operator. The ring control unit 2 notifies the control-frame managing unit 3-2 that the recovery inspection frame 8 is to be transmitted to the transfer apparatus 1C. The control-frame managing unit 3-2 transmits the recovery inspection frame 8 [addressed to 1C] via the port 1C-2. The recovery inspection frame 8 [addressed to 1C] is transferred by another transfer apparatus. As a result, the control-frame managing unit 3-1 of the transfer apparatus 1C receives the recovery inspection frame 8 [addressed to 1C] via the port 1C-1. The control-frame managing unit 3-1 notifies the ring control unit 2 that the recovery inspection frame 8 is received. According to the port-information storing unit 4, the ring IDs "R1" of the port 1C-1 and the ring IDs "R1" of the port 1C-2 coincide with each other. Therefore, the ring control unit 2 mainly closes the port 1C-2 and rewrites the transfer condition of the port 1C-2 in the port-information storing unit 4 to "normallyclosed". The ring control unit 2 notifies the control-frame managing unit 3-2 that the recovery open command frame 9 addressed to the transfer apparatus 1C is to be transmitted. The control-frame managing unit 3-2 transmits the recovery open command frame 9 [addressed to 1C] via the port 1C-2.

Similarly, operations performed by the transfer apparatus 1A when the ports 1A-2 and 1B-1 are recovered from a failure that occurs between the transfer apparatus 1A and the transfer apparatus 1B and a restoration instruction for the port 1C-2 is inputted are explained referring to FIGS. 14 and 15. The control-frame managing unit 3-1 of the transfer apparatus 1A receives the recovery inspection frame 8 [addressed to 1C] via the port 1A-1. The control-frame managing unit 3-1 notifies the ring control unit 2 that the recovery inspection frame 8 is received. The ring control unit 2 acquires, from the port-information storing unit 4, the port ID "port 1A-2" having the same ID as the ring ID "R1" stored in the recovery inspection frame 8. According to the port-information storing unit 4, the transfer condition of the port 1A-2 is not "closed". Therefore, the ring control unit 2 notifies the control-frame managing unit 3-2 that the recovery inspection frame 8 with the priority ring ID set to R1 is to be transferred to the transfer apparatus 1C. The control-frame managing unit 3-2 transfers the recovery inspection frame 8 [addressed to 1C] via the port 1A-2.

The control-frame managing unit 3-1 of the transfer apparatus 1A receives the recovery open command frame 9 [addressed to 1C] via the port 1A-1. The control-frame managing unit 3-1 notifies the ring control unit 2 that the recovery open command frame 9 is received. The ring control unit 2 initializes the transfer table. According to the port-information storing unit 4, the transfer condition of the port 1A-2 is "recovered". Therefore, the ring control unit 2 opens the port 1A-2 and rewrites the transfer condition of the port 1A-2 in the port-information storing unit 4 of the transfer apparatus A to "open". Moreover, the ring control unit 2 notifies the control-frame managing unit 3-2 that the recovery open command frame 9 addressed to the transfer apparatus 1C is to be transferred. The control-frame managing unit 3-2 transfers the recovery open command frame 9 [addressed to 1C] via the port 1A-2. The transfer apparatus 1B operates in the same manner as the transfer apparatus 1A.

According to the operations, when the ports 1A-2 and 1B-1 are recovered from a failure, after the designated port 1C-2 is normally closed, the ports 1A-2 and 1B-1 closed in a failure location are opened. Therefore, it is possible to prevent generation of a loop and change back the transfer apparatuses to a condition at normal time.

As described above, according to the embodiment of the present invention, during path switching due to occurrence of a failure, a port in which the failure is detected is closed and, then, a normally closed port is opened. This makes it possible to perform, regardless of line disconnection in both directions and line disconnection in one direction, restoration without generating a loop when a failure occurs. This also makes it possible to prevent generation of a loop even if path switching is performed when a failure is detected by mistake.

According to the embodiment of the present invention, a port that connects a line or an apparatus in which a failure occurs is closed. This makes it possible to perform path switching due to occurrence of a failure without segmenting a path.

According to the embodiment of the present invention, when a port is recovered from a failure, a designated port is closed and, then, the port closed by the failure is opened. This makes it possible to perform restoration without generating a loop.

According to the embodiment of the present invention, when a failure is detected in a shared port, path switching is performed by one priority ring. This makes it possible to prevent generation of a super loop due to path switching in a multi-ring redundant communication path.

The present invention has been explained referring to the embodiment. However, the present invention is not limited to the embodiment. Various modifications are possible without departing from the spirit of the present invention. The present invention can be changed and implemented as appropriate as long as the object of the present invention is attained and the effect of the present invention is realized. For example, in the embodiment, the number of transfer apparatuses in one ring is set to six. However, the number of the transfer apparatuses is not limited to this number. A ring redundant communication path can be logically multiplexed by using identifiers of VLANs (Virtual Local Area Networks) or the like. In this case, a position of a normallyclosed port may be different for each of the VLANs. The open command frame 7 or the recovery open command frame 9 do not always have to be transmitted through a normal communication path. Information concerning a communication path through which the open command frame 7 or the recovery open command frame 9 is transmitted can be given by an instruction from the outside according to operation by an administrator or other methods.

In the method explained in the embodiment, both of a transfer apparatus that detects a failure according to non-reception of an inspection frame and a transfer apparatus that detects a failure according to reception of non-arrival notification frame close ports in which the failures are detected and transmit open command frames, respectively. However, the present invention is not limited to this. The present invention can also be applied to other methods. For example, in one method, only a transfer apparatus that detects a failure according to non-reception of an inspection frame (in the example described above, only the transfer apparatus 1A) closes a port (the 1A-2 port) in which the failure is detected and transmits an open command frame to the transfer apparatus 1B. In another method, a transfer apparatus that detects a failure according to non-reception of an inspection frame and a transfer apparatus that detects a failure according to reception of a non-arrival notification frame are prioritized in advance. Therefore, for example, it is determined which transfer apparatus transmits an open command frame in what kind of situation. The transfer apparatus transmits the open command frame according to the determination.

As advantages of the method of both transfer apparatuses, which detect failures, closing the ports and transmitting the open command frames, an operation administrator who operates and manages the ring redundant communication path can easily specify a failure location of the communication path and, because the open command frames are transmitted through two routes, the open command frames tend to be surely transmitted.

INDUSTRIAL APPLICABILITY

As described above, in the ring redundant communication path control method according to the present invention, under a ring redundant communication path in which a plurality of transfer apparatuses are annularly connected by connecting two ports of a transfer apparatus to ports of transfer apparatuses adjacent thereto, respectively, and a frame transfer path for transferring frames in opposite directions is redundantly configured, at least one port among the ports, which annularly connect the transfer apparatuses, is set as a normally closed port that is closed even in a normal condition of the ring redundant communication path. Therefore, the ring redundant communication path control method is useful for causing a user to uniquely select the frame transfer path. In particular, the ring redundant communication path control method is suitable for preventing generation of a loop and occurrence of segmentation of a path during occurrence of a failure even when a line in one direction is disconnected or when an inspection frame is discarded because of a transfer delay, overflow of a transfer buffer, or the like.

The invention claimed is:

1. A ring redundant communication path control method of causing, under a ring redundant communication path in which a plurality of transfer apparatuses are annularly connected by connecting two ports of a transfer apparatus to ports of transfer apparatuses adjacent thereto, respectively, and a frame transfer path for transferring frames in opposite directions is redundantly configured, a user to uniquely select the frame transfer path by setting at least one port among the ports, which annularly connect the transfer apparatuses, as a normally closed port that is closed even in a normal condition of the ring redundant communication path, the method comprising, for each of the transfer apparatuses:

periodically transmitting an inspection frame for inspecting a communication path between the transfer apparatus and each of the adjacent transfer apparatuses to each of the adjacent transfer apparatuses from each of the ports connected to each of the adjacent transfer apparatuses;

detecting, when the inspection frame transmitted from each of the adjacent transfer apparatuses is not received for a fixed time from a port connected to the adjacent transfer apparatus, a failure of the communication path in the port and transmitting a non-arrival notification frame, which notifies that the inspection frame has not arrived yet, from the port to the adjacent transfer apparatus;

detecting, when the non-arrival notification frame transmitted from each of the adjacent transfer apparatuses is received from a port connected to the transfer apparatus, a failure of the communication path in the port;

closing, when a failure is detected in any one of the ports connected to each of the adjacent transfer apparatuses, the port in which the failure is detected and transmitting an open command frame for commanding to open the normally closed port from another port other than the closed port;

transferring, when the open command frame is received, the open command frame from another port configuring a ring redundant communication path same as that of the port in which the open command frame is received; and opening the normally closed port when the other port other than the closed port in which the failure is detected, the port in which the open command frame is received, or the other port configuring the ring redundant communication path same as that of the port in which the open command frame is received is the normally closed port.

2. The ring redundant communication path control method according to claim 1, further comprising, for each of the transfer apparatuses:

detecting, when the inspection frame is received in a port in which a failure is detected according to non-reception of the inspection frame, recovery in the port and stopping the transmission of the non-arrival notification frame from the port; and detecting, when the non-arrival notification frame is not received for a fixed time from a port in which a failure is detected according to reception of the non-arrival notification frame, recovery in the port.

3. The ring redundant communication path control method according to claim 2, wherein, after detecting the recovery in the port in which the failure is detected, the method further comprising, for each of the transfer apparatuses:

transmitting, when any one of the ports of the transfer apparatus is designated as the normally-closed port, a recovery inspection frame for inspecting the recovery from the designated port to the transfer apparatus itself;

closing, when the recovery inspection frame addressed to the transfer apparatus itself is received, the port designated as the normally-closed port and transmitting a recovery open command frame for commanding to open the port in which the recovery is detected from the normally closed port to the transfer apparatus itself;

transferring, when a recovery inspection frame addressed to another transfer apparatus is received, the recovery inspection frame from another port configuring a ring redundant communication path same as that of a port in which the recovery inspection frame is received; and opening, when the port in which the recovery is detected is present in the transfer apparatus itself, the port when the recovery open command frame is received.

4. The ring redundant communication path control method according to claim 3, further comprising, for each of the transfer apparatuses a step of initializing, when the open command frame or the recovery open command frame is received, a transfer table formed by learning a transfer destination port of a frame.

5. The ring redundant communication path control method according to claim 1, wherein when a plurality of the ring redundant communication paths are present and configure a multi-ring redundant communication path, at least two transfer apparatuses configuring the ring redundant communication path are shared transfer apparatuses that configure another ring redundant communication path as well, one port of the shared transfer apparatuses is a shared port that configures the ring redundant communication path and the other ring redundant communication path, the ring redundant communication path is configured by the other first port different from the shared port and the other ring redundant communication path is configured by the other second port different from the shared port, and the transmitting, the detecting when the inspection frame is not received, the detecting when the non-arrival notification frame is received, the closing, the transferring, and the opening are also performed for each of the shared transfer apparatuses.

6. The ring redundant communication path control method according to claim 5, further comprising closing the shared port when a failure is detected in the shared port and transmitting, concerning a ring redundant communication path to which the shared port belongs and that is set as a priority ring in advance, an open command frame for commanding to open the normally closed port from the other port configuring the ring redundant communication path.

7. A ring redundant communication path control method of causing, under a ring redundant communication path in which a plurality of transfer apparatuses are annularly connected by connecting two ports of a transfer apparatus to ports of transfer apparatuses adjacent thereto, respectively, and a frame transfer path for transferring frames in opposite directions is redundantly configured, a user to uniquely select the frame transfer path by setting at least one port among the ports, which annularly connect the transfer apparatuses, as a normally closed port that is closed even in a normal condition of the ring redundant communication path, the method comprising, for each of the transfer apparatuses:

periodically transmitting an inspection frame for inspecting a communication path between the transfer apparatus and each of the adjacent transfer apparatuses to each of the adjacent transfer apparatuses from each of the ports connected to each of the adjacent transfer apparatuses;

detecting, when the inspection frame transmitted from each of the adjacent transfer apparatuses is not received for a fixed time from a port connected to the adjacent transfer apparatus, a failure of the communication path in the port and transmitting a non-arrival notification frame, which notifies that the inspection frame has not arrived yet, from the port to the adjacent transfer apparatus;

detecting, when the non-arrival notification frame transmitted from each of the adjacent transfer apparatuses is received from a port connected to the transfer apparatus, a failure of the communication path in the port;

transferring, when an open command frame for commanding to open the normally closed port is received, the open command frame from the other port configuring a ring redundant communication path same as that of a port that receives the open command frame, the open command frame being transmitted from one of a transfer apparatus having a port in which a failure is detected according to non-reception of the inspection frame and a transfer apparatus having a port in which a failure is detected according to reception of the non-arrival notification frame; and opening the normally closed port when the other port other than the closed port in which the failure is detected, the port in which the open command frame is detected, or the other port configuring the ring redundant communication path same as that of the port in which the open command frame is received is the normally closed port, wherein the method includes, for one of the transfer apparatus having the port in which the failure is detected according to non-reception of the inspection frame and the transfer apparatus having the port in which the failure is detected according to reception cf the non-arrival notification frame, closing the port in which the failure is detected and transmitting an open command frame from the other port other than the closed port.

8. A transfer apparatus, provided in a ring redundant communication path, comprising:

first and second ports belonging to the ring redundant communication path; and a control unit for setting each of the first and second ports to a first condition in which at least normal frames are not transferred, and a second condition in which both the normal frames and control frames are transferred, wherein the control unit, transmits a second control frame for changing the second first condition to the first second condition from at least one of the first and second ports in response to a first control frame for inspecting the ring redundant communication path not being received for a fixed time via the first port.

9. The transfer apparatus according to claim 8, wherein the control unit periodically transmits the first control frame for inspecting the ring redundant communication path from the first port.

10. The transfer apparatus according to claim 8, wherein the control unit, when the first control frame for inspecting the ring redundant communication path is not received for the fixed time via the first port, sets the first port to the first condition.

11. The transfer apparatus according to claim 8, wherein the control unit, when the first control frame for inspecting the ring redundant communication path is not received for the fixed time via the first port, transmits, from the first port, a third control frame indicating that the first control frame for inspecting the ring redundant communication path is not received for the fixed time, as the second control frame for changing the first condition to the second condition.

12. The transfer apparatus according to claim 8, wherein the control unit, when a third control frame indicating that the first control frame for inspecting the ring redundant communication path is not received for the fixed time is received via the first port, transmits the second control frame for changing the first condition to the second condition from the second port.

13. The transfer apparatus according to claim 8, wherein the control unit transmits a third control frame for inspecting recovery of a failure port from the first port, the control unit sets, when the third control frame for inspecting recovery of the failure port is received via the second port, the first port or the second port to the first condition, and further transmits a fourth control frame for changing the first condition to the second condition from at least one of the first and second ports.

14. The transfer apparatus according to claim 8, wherein the control unit, when the second control frame for changing the first condition to the second condition is received via the first port and when the first port or the second port is in the first condition, sets the port with the first condition to the second condition.

15. The transfer apparatus according to claim 8,
further comprising
a storage unit storing a transfer table formed by learning transfer destination ports of the control frames and the normal frames, wherein
the control unit initializes the transfer table when the second control frame for changing the first condition to the second condition is received.

16. The transfer apparatus according to claim 8,
further comprising
a third port belonging to a ring redundant communication path different from the ring redundant communication path to which the first and second ports belong, the third port having same functions as those of the first port, wherein
the second port is used as a shared port belonging to the two ring redundant communication paths.

17. The transfer apparatus according to claim 16,
further comprising
a priority-ring information storage unit storing priority-ring information indicating that the ring redundant communication path to which the first port belongs or the ring redundant communication path to which the third port belongs is set to a priority ring, wherein
the first port via which the control frame for changing the first condition to the second condition is transmitted by the control unit belongs to the priority ring.

* * * * *

UNITED STATES PATENT AND TRADEMARK OFFICE
CERTIFICATE OF CORRECTION

PATENT NO. : 7,961,596 B2
APPLICATION NO. : 12/281773
DATED : June 14, 2011
INVENTOR(S) : Maruyoshi et al.

It is certified that error appears in the above-identified patent and that said Letters Patent is hereby corrected as shown below:

IN THE CLAIMS

Claim 8, line 59, change "changing the second first condition to the first second" to --changing the first condition to the second--.

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,961,596 B2
APPLICATION NO. : 12/281773
DATED : June 14, 2011
INVENTOR(S) : Maruyoshi et al.

It is certified that error appears in the above-identified patent and that said Letters Patent is hereby corrected as shown below:

IN THE CLAIMS

Claim 8, Column 25, line 59, change "changing the second first condition to the first second" to --changing the first condition to the second--.

This certificate supersedes the Certificate of Correction issued May 15, 2012.

Signed and Sealed this
Twelfth Day of June, 2012

David J. Kappos
*Director of the United States Patent and Trademark Office*